(12) United States Patent
Zhang et al.

(10) Patent No.: US 11,591,857 B2
(45) Date of Patent: Feb. 28, 2023

(54) CUTTING TOOL WITH PRE-FORMED HARDFACING SEGMENTS

(71) Applicant: Smith International, Inc., Houston, TX (US)

(72) Inventors: Youhe Zhang, Spring, TX (US); Huimin Song, Spring, TX (US); Jan Stefan Morley, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 275 days.

(21) Appl. No.: 16/615,974

(22) PCT Filed: May 22, 2018

(86) PCT No.: PCT/US2018/033770
§ 371 (c)(1),
(2) Date: Nov. 22, 2019

(87) PCT Pub. No.: WO2018/222436
PCT Pub. Date: Dec. 6, 2018

(65) Prior Publication Data
US 2020/0123858 A1 Apr. 23, 2020

Related U.S. Application Data

(60) Provisional application No. 62/513,351, filed on May 31, 2017, provisional application No. 62/513,352, filed on May 31, 2017.

(51) Int. Cl.
*E21B 10/43* (2006.01)
*E21B 10/633* (2006.01)
(Continued)

(52) U.S. Cl.
CPC ............. *E21B 10/43* (2013.01); *E21B 10/54* (2013.01); *E21B 10/633* (2013.01); *B33Y 10/00* (2014.12); *B33Y 80/00* (2014.12); *E21B 7/064* (2013.01)

(58) Field of Classification Search
CPC ........ E21B 10/54; E21B 10/43; E21B 10/633; B33Y 80/00
See application file for complete search history.

(56) References Cited

U.S. PATENT DOCUMENTS 2,255,435 A 9/1941 Newton
2,693,938 A 11/1954 Roberts
(Continued)

FOREIGN PATENT DOCUMENTS

EP 3187285 A1 7/2017
WO 2012071449 A2 5/2012
(Continued)

OTHER PUBLICATIONS

International Search Report and Written Opinion issued in International Patent application PCT/US2018/033770 dated Sep. 13, 2018, 20 pages.
(Continued)

*Primary Examiner* — Blake Michener

(57) ABSTRACT

A downhole tool includes a blade coupled to a body. The body and blade rotate about a longitudinal axis. A pre-formed faceplate is connected to the blade and partially defines a cutter pocket therein. Another portion of the cutter pocket is defined by the blade. The cutter pocket includes a sidewall and a base, with the sidewall formed by the blade and the pre-formed faceplate, and the base formed by the blade. The pre-formed faceplate includes a pre-formed hardfacing element. A downhole tool includes a blade coupled to a body. The body and blade rotate about a longitudinal axis. A pre-formed segment is connected to the blade and has a
(Continued)

cutter pocket therein. The cutter pocket includes a sidewall and a base, and a cutting element is coupled to the preformed segment and within the cutter pocket. The preformed segment is optionally made of a different material than the blade and has increased wear and/or erosion resistance compared to the blade.

18 Claims, 14 Drawing Sheets

(51) Int. Cl.
*E21B 10/54* (2006.01)
*B33Y 10/00* (2015.01)
*B33Y 80/00* (2015.01)
*E21B 7/06* (2006.01)

(56) References Cited

U.S. PATENT DOCUMENTS

| | | |
|---|---|---|
| 3,127,945 A | 4/1964 | Bridwell |
| 4,445,580 A | 5/1984 | Sahley |
| 4,646,857 A | 3/1987 | Thompson |
| 4,682,663 A | 7/1987 | Daly et al. |
| 4,830,123 A | 5/1989 | Daly et al. |
| 4,838,366 A | 6/1989 | Jones |
| 5,452,771 A | 9/1995 | Blackman et al. |
| 5,560,440 A | 10/1996 | Tibbitts |
| 6,209,420 B1 * | 4/2001 | Butcher ............ B22F 3/1275 76/108.2 |
| 6,241,036 B1 | 6/2001 | Lovato et al. |
| 6,260,636 B1 | 7/2001 | Cooley et al. |
| 6,454,030 B1 | 9/2002 | Findley et al. |
| 6,458,471 B2 | 10/2002 | Lovato et al. |
| 6,568,491 B1 | 5/2003 | Matthews, III et al. |
| 6,651,756 B1 | 11/2003 | Costo, Jr. et al. |
| 6,655,481 B2 | 12/2003 | Findley et al. |
| 6,742,611 B1 | 6/2004 | Illerhaus et al. |
| 6,746,506 B2 | 6/2004 | Liu et al. |
| 7,070,011 B2 * | 7/2006 | Sherwood, Jr. ......... E21B 10/55 175/428 |
| 7,070,734 B2 | 7/2006 | Liu et al. |
| 7,096,982 B2 | 8/2006 | McKay et al. |
| 7,571,782 B2 * | 8/2009 | Hall ..................... E21B 10/43 175/425 |
| 7,597,159 B2 | 10/2009 | Overstreet |
| 7,644,786 B2 | 1/2010 | Lockstedt et al. |
| 7,703,555 B2 | 4/2010 | Overstreet |
| 7,703,559 B2 | 4/2010 | Shen et al. |
| 7,722,802 B2 | 5/2010 | Pfeifer et al. |
| 7,784,567 B2 | 8/2010 | Choe et al. |
| 7,814,997 B2 | 10/2010 | Aliko et al. |
| 7,819,208 B2 | 10/2010 | Pessier et al. |
| 7,832,456 B2 | 11/2010 | Calnan et al. |
| 7,832,457 B2 | 11/2010 | Calnan et al. |
| 7,954,569 B2 | 6/2011 | Mirchandani et al. |
| 8,002,052 B2 | 8/2011 | Stevens et al. |
| 8,007,714 B2 | 8/2011 | Mirchandani et al. |
| 8,087,324 B2 | 1/2012 | Eason et al. |
| 8,091,655 B2 | 1/2012 | Shen et al. |
| 8,172,914 B2 | 5/2012 | Mirchandani et al. |
| 8,201,610 B2 | 6/2012 | Stevens et al. |
| 8,201,647 B2 | 6/2012 | Zulak |
| 8,230,952 B2 | 7/2012 | Schwefe et al. |
| 8,235,149 B2 | 8/2012 | Lockstedt et al. |
| 8,272,458 B2 | 9/2012 | Nackerud |
| 8,312,941 B2 | 11/2012 | Mirchandani et al. |
| 8,317,893 B2 | 11/2012 | Stevens et al. |
| 8,388,723 B2 | 3/2013 | Overstreet |
| 8,403,080 B2 | 3/2013 | Mirchandani et al. |
| 8,413,746 B2 | 4/2013 | Shen et al. |
| 8,459,382 B2 | 6/2013 | Aliko et al. |
| 8,464,814 B2 | 6/2013 | Stevens et al. |
| 8,567,531 B2 | 10/2013 | Belnap et al. |
| 8,720,610 B2 | 5/2014 | Lanning et al. |
| 8,757,297 B2 | 6/2014 | Aliko et al. |
| 8,758,462 B2 | 6/2014 | Overstreet |
| 8,789,625 B2 | 7/2014 | Mirchandani et al. |
| 8,800,691 B2 | 8/2014 | Shen et al. |
| 8,814,968 B2 | 8/2014 | Jiang et al. |
| 8,869,920 B2 | 10/2014 | Stevens et al. |
| 8,881,791 B2 | 11/2014 | Eason et al. |
| 8,960,332 B2 | 2/2015 | Ugwuocha et al. |
| 8,991,523 B2 | 3/2015 | Shen et al. |
| 9,033,070 B2 | 5/2015 | Shen et al. |
| 9,068,408 B2 | 6/2015 | Vempati et al. |
| 9,115,554 B2 | 8/2015 | Vempati et al. |
| 9,200,485 B2 | 12/2015 | Eason et al. |
| 9,393,674 B2 | 7/2016 | Keshavan |
| 9,482,058 B2 * | 11/2016 | Siracki ............... E21B 10/573 |
| 9,488,012 B2 | 11/2016 | Thigpen |
| 9,506,297 B2 | 11/2016 | Overstreet |
| 9,579,717 B2 | 2/2017 | Vempati et al. |
| 9,790,744 B2 | 10/2017 | Atkins et al. |
| 9,869,130 B2 | 1/2018 | Rose et al. |
| 9,890,595 B2 | 2/2018 | Oxford et al. |
| 9,937,589 B2 | 4/2018 | Soshi |
| 9,982,490 B2 * | 5/2018 | Fuller .................. E21B 17/14 |
| 10,024,108 B2 | 7/2018 | Gylling |
| 10,029,301 B2 | 7/2018 | Cook, III et al. |
| 10,029,305 B2 | 7/2018 | Cook, III et al. |
| 10,029,306 B2 | 7/2018 | Voglewede et al. |
| 10,059,092 B2 | 8/2018 | Welch et al. |
| 10,077,638 B2 | 9/2018 | Overstreet et al. |
| 10,082,024 B2 | 9/2018 | Raschka et al. |
| 10,107,044 B2 | 10/2018 | Vempati et al. |
| 10,125,549 B2 * | 11/2018 | Olsen .................. E21B 10/54 |
| RE47,369 E | 4/2019 | Shen et al. |
| 10,267,095 B2 | 4/2019 | Keshavan |
| 2005/0211475 A1 | 9/2005 | Mirchandani et al. |
| 2007/0056777 A1 * | 3/2007 | Overstreet ............ C22C 29/08 175/433 |
| 2008/0314645 A1 | 12/2008 | Hall et al. |
| 2009/0107730 A1 | 4/2009 | Green et al. |
| 2010/0101866 A1 | 4/2010 | Bird |
| 2010/0108401 A1 | 5/2010 | Lanning et al. |
| 2010/0276208 A1 | 11/2010 | Sue |
| 2011/0108326 A1 | 5/2011 | Jones et al. |
| 2011/0297454 A1 * | 12/2011 | Shen .................. E21B 10/633 175/431 |
| 2012/0097456 A1 | 4/2012 | Mirchandani et al. |
| 2012/0125695 A1 | 5/2012 | Vempati et al. |
| 2012/0247840 A1 | 10/2012 | Vempati et al. |
| 2013/0320598 A1 | 12/2013 | Atkins et al. |
| 2013/0333950 A1 | 12/2013 | Atkins et al. |
| 2013/0333952 A1 | 12/2013 | Bloomfield |
| 2014/0326516 A1 | 11/2014 | Haugvaldstad et al. |
| 2014/0360792 A1 * | 12/2014 | Azar .................. E21B 10/5735 175/432 |
| 2014/0367174 A1 * | 12/2014 | Siracki .............. E21B 10/573 175/374 |
| 2015/0129320 A1 | 5/2015 | Overstreet et al. |
| 2016/0083304 A1 | 3/2016 | Mironets et al. |
| 2016/0089821 A1 | 3/2016 | Atkins et al. |
| 2016/0258242 A1 | 9/2016 | Hayter et al. |
| 2016/0279703 A1 | 9/2016 | Clare et al. |
| 2016/0375493 A1 | 12/2016 | Stoyanov et al. |
| 2017/0014901 A1 | 1/2017 | Powell |
| 2017/0037518 A1 | 2/2017 | Oxford et al. |
| 2017/0050241 A1 | 2/2017 | Thomas et al. |
| 2017/0072465 A1 | 3/2017 | Welch et al. |
| 2017/0107764 A1 | 4/2017 | Cook et al. |
| 2017/0211331 A1 | 7/2017 | Vempati et al. |
| 2017/0342779 A1 | 11/2017 | Cook |
| 2018/0002986 A1 | 1/2018 | Zhang et al. |
| 2018/0038167 A1 | 2/2018 | Xu et al. |
| 2018/0058148 A1 | 3/2018 | Zhang et al. |
| 2018/0162048 A1 * | 6/2018 | Gibson ................. B22F 10/10 |
| 2018/0297351 A1 | 10/2018 | Welch et al. |
| 2018/0305266 A1 | 10/2018 | Gibson et al. |
| 2018/0305790 A1 | 10/2018 | Liu et al. |
| 2018/0312946 A1 | 11/2018 | Gigliotti, Jr. et al. |
| 2018/0314645 A1 | 11/2018 | Meredith et al. |

(56) References Cited

U.S. PATENT DOCUMENTS

| | | | |
|---|---|---|---|
| 2018/0320449 | A1 | 11/2018 | Zhang et al. |
| 2019/0071930 | A1 | 3/2019 | Hird et al. |
| 2019/0106941 | A1 | 4/2019 | Prichard et al. |
| 2019/0128072 | A1* | 5/2019 | Griffo ................. E21B 10/32 |

FOREIGN PATENT DOCUMENTS

| | | | |
|---|---|---|---|
| WO | 2014149132 | A2 | 9/2014 |
| WO | 2016200832 | A1 | 12/2016 |
| WO | 2018050796 | A1 | 3/2018 |
| WO | 2018200548 | A1 | 11/2018 |

OTHER PUBLICATIONS

Business Wire, BlueFire Finalized Digital Model of Drill Bit for 3D Printing, https://www.businesswire.com/news/home/20131205005411/en/BlueFire-Finalizes-Digital-Model-Drill-Bit-3D, Houston, Texas, Dec. 5, 2013, 2 pages.

Industrial Laser Solutions, Drill bit innovator exploring 3D laser manufacturing systems, https://www.industrial-lasers.com/articles/2013/09/drill-bit-innovator-exploring-3d-laser-manufacturing-systems.html, Houston, Texas, Sep. 30, 2013, 2 pages.

International Preliminary Report on Patentability issued in International Patent Application PCT/US2018/033770 dated Dec. 3, 2019, 16 pages.

Search and Examination report issued in European Patent Application 18810138.0 dated Dec. 21, 2020, 6 pages.

First Office Action and Search report issued in Chinese Patent Application 2018800457530 dated Dec. 28, 2020, 37 pages.

Second Office Action issued in Chinese Patent Application 201880045753.0 dated Jun. 18, 2021, 18 pages.

Substantive Examination Report issued in Saudi Arabian Patent Application No. 519410679 dated Jul. 10, 2022, 7 pages.

Decision on Grant issued in Russian Patent Application No. 2019144053/03(085244) dated Feb. 3, 2022, 22 pages with English Translation.

Official Action and Search Report issued in Russian Patent Application No. 2019144053/03(085244) dated Sep. 13, 2021, 17 pages with English translation.

Communication pursuant to Article 94(3) issued in European Patent Application 18810138.0 dated Oct. 28, 2022, 5 pages.

* cited by examiner

CUTTING TOOL WITH PRE-FORMED HARDFACING SEGMENTS

CROSS-REFERENCE TO RELATED APPLICATIONS

This application is the U.S. national stage entry of International Patent Application Serial No. PCT/US2018/033770 filed on May 22, 2018, which application claims the benefit of U.S. Provisional Patent Application Ser. No. 62/513,351 and U.S. Patent Application No. 62/513,352, each filed on May 31, 2017, which applications are incorporated herein by this reference in their entireties.

BACKGROUND

Wellbores are drilled into a surface location or seabed for a variety of exploratory or extraction purposes. For example, a wellbore may be drilled to access fluids, such as liquid and gaseous hydrocarbons, stored in subterranean formations and to extract the fluids from the formations. A variety of drilling methods may be utilized depending partly on the characteristics of the formation through which the wellbore is drilled.

During drilling of a wellbore, cutting tools such as drill bits and underreamers are used to remove material from the earth to extend or enlarge the wellbore. The cutting tools include cutting elements that may experience wear or damage during the cutting operations. Damaged or lost cutting elements can reduce the effectiveness of the cutting tool and slow or stop work on the wellbore. Additionally, the cutting elements of the cutting tool may reach the end of their operational lifetime before the body of the cutting tool itself.

SUMMARY

In some embodiments, a cutting tool includes a body, blade, and a faceplate. The body rotates about a longitudinal axis and haw a blade coupled thereto and extending radially therefrom. The faceplate is coupled to the blade and the faceplate and blade cooperatively define at least one cutter pocket that is partially in the faceplate and partially in the blade.

According to some embodiments, a downhole tool includes a rotatable body and a blade coupled to the body. The blade includes a recess therein, and which defines an interface. A pre-formed hardfacing element is coupled to the blade along at least a portion of the interface and the blade and pre-formed hardfacing element cooperatively define at least one cutter pocket such that the cutter pocket is partially within the pre-formed hardfacing element and partially within the blade.

In some embodiments, a method of manufacturing a downhole tool includes forming a blade that has a recess and a portion of a cutter pocket adjacent the recess. At least one faceplate is formed, and the at least one faceplate includes another portion of the cutter pocket. The at least one faceplate is positioned in the recess such that the portions of the cutter pocket within the blade and at least one faceplate cooperatively define a complete cutter pocket, and the faceplate is connected to the blade.

In some embodiments, a cutting tool includes a body, a blade, and a pre-formed segment. The body is configured to rotate about the longitudinal axis. The blade is connected to and extends radially from body. The pre-formed segment is connected to the blade and has a cutter pocket therein. The cutter pocket has a sidewall and a base.

In some embodiments, a downhole tool includes a body configured to rotate about a longitudinal axis. A blade is coupled to the body and includes a recess that defines an interface. A segment is connected to the blade at the interface, and includes at least one cutter pocket with a sidewall and a base.

According to some embodiments, a method of manufacturing a downhole tool includes forming a blade with a recess therein. A hardened, replaceable segment is formed and includes at least one cutter pocket. The hardened, replaceable segment is positioned in the recess and connected to the blade.

This summary is provided to introduce a selection of concepts that are further described below in the detailed description. This summary is not intended to identify key or essential features of the claimed subject matter, nor is it intended to be used as an aid in limiting the scope of the claimed subject matter. Indeed, additional features and aspects of embodiments of the disclosure will be set forth in the description, and in part will be obvious from the description, or may be learned by the practice of such embodiments. The features and aspects of such embodiments may be realized and obtained by means of the instruments and combinations particularly pointed out in the description and in the appended claims.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Except for drawings that are clearly schematic or exaggerated in nature, drawings should be considered to scale for some embodiments of the present disclosure, but not to scale for other embodiments. Understanding that the drawings depict some example embodiments, the embodiments will be described and explained with additional specificity and detail through the use of the accompanying drawings in which:

FIG. 8-1 is an exploded view of a bit with a pre-formed faceplate positioned on a blade, according to at least one embodiment of the present disclosure;

FIG. 8-2 is a partial cross-sectional view of a bit with pre-formed faceplates positioned on leading and top surfaces of a blade, according to at least one embodiment of the present disclosure;

DETAILED DESCRIPTION

Embodiments of this disclosure generally relate to devices, systems, and methods for increasing operational lifetime and/or decreasing downtime in a cutting tool. More particularly, embodiments of the present disclosure relate to devices, systems, and methods for positioning a replaceable cutting element segment on a cutting tool, where the segment has a higher wear or erosion resistance than a body or blade material of the cutting tool.

In some embodiments, a cutting tool according to the present disclosure has one or more cutting elements to remove material in a downhole environment. During cutting operations, the area at or near the cutting element may experience high abrasion and/or erosion conditions. A cutting tool according to the present disclosure may include one or more segments of a high wear and erosion resistance material positioned adjacent to or fully or partially around the cutting element to increase the operational lifetime and reparability of the cutting tool.

Figure 1:
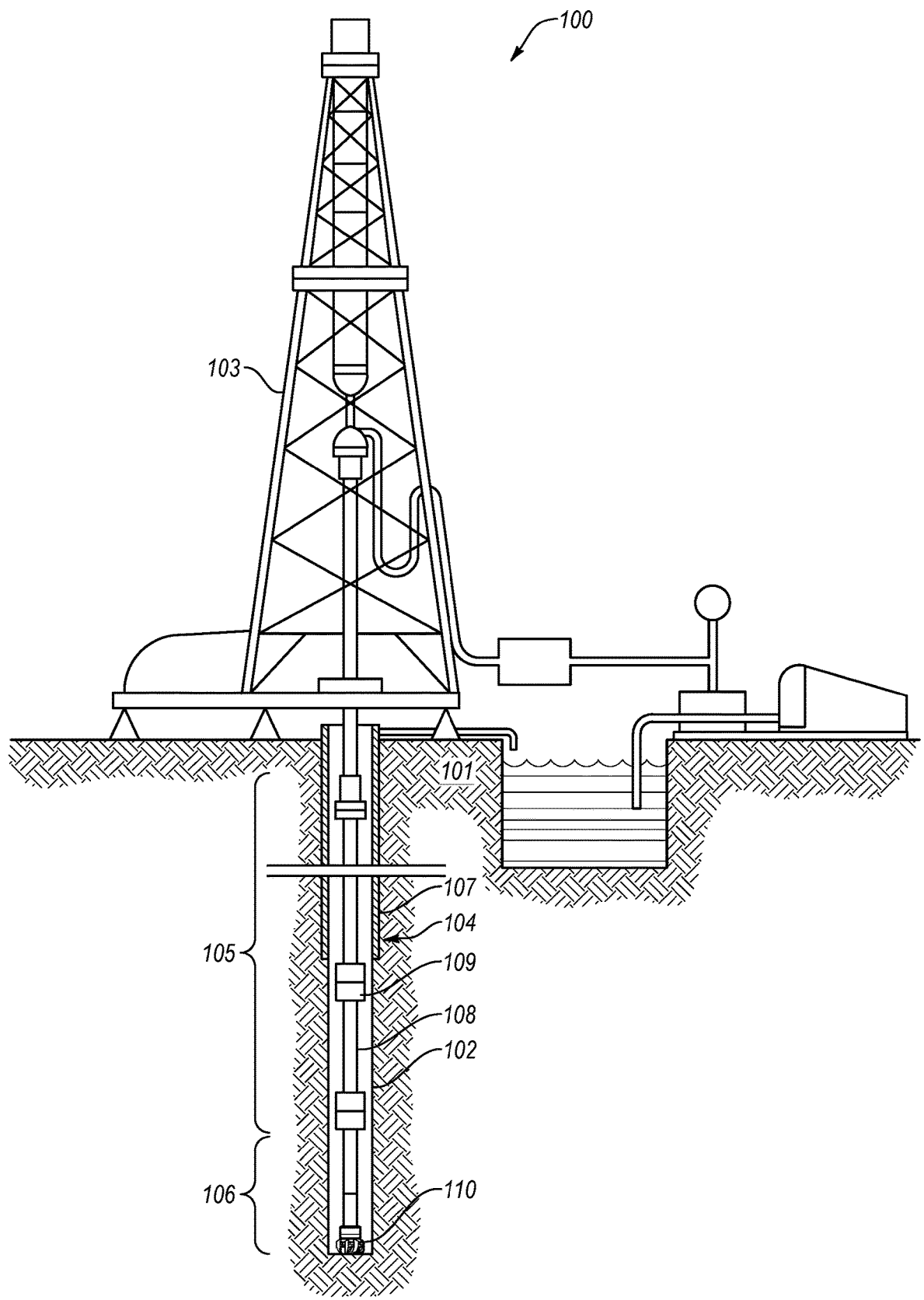
FIG. 1 is a schematic view of a drilling system, according to at least one embodiment of the present disclosure.

FIG. 1 shows one example of a drilling system 100 for drilling an earth formation 101 to form a wellbore 102. The drilling system 100 includes a drill rig 103 used to rotate a drilling tool assembly 104 that extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 a connected end-to-end through tool joints 109. The drill string 105 transmits drilling fluid through a central bore and transmits rotational power from the drill rig 103 to the BHA 106. In some embodiments, the drill string 105 further includes additional components such as subs, pup joints, etc. The drill pipe 108 provides a hydraulic passage through which drilling fluid is pumped from the surface. The drilling fluid discharges through nozzles, jets, or other orifices in the bit 110 and/or the BHA 106 for the purposes of cooling the bit 110 and cutting structures thereon, and for transporting cuttings out of the wellbore 102.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The bit 110 may also include other cutting structures in addition to or other than a drill bit, such as milling or underreaming tools.

In general, the drilling system 100 may include other drilling components and accessories, such as make-up/break-out devices (e.g., iron roughnecks or power tongs), valves (e.g., kelly cocks, blowout preventers, and safety valves), other components, or combinations of the foregoing. Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading formation or other downhole materials. For instance, the bit 110 may be a drill bit suitable for drilling the earth formation 101. Example types of drill bits used for drilling earth formations are fixed-cutter or drag bits, roller cone bits, and percussion hammer bits. In some embodiments, the bit 110 is an expandable underreamer used to expand a wellbore diameter. In other embodiments, the bit 110 is a mill used for removing metal, composite, elastomer, other downhole materials, or combinations thereof. For instance, the bit 110 may be used with a whipstock to mill into a casing 107 lining the wellbore 102. The bit 110 may also be used to mill away tools, plugs, cement, other materials within the wellbore 102, or combinations thereof. Swarf or other cuttings formed by use of a mill may be lifted to surface, or may be allowed to fall downhole.

Figure 2:
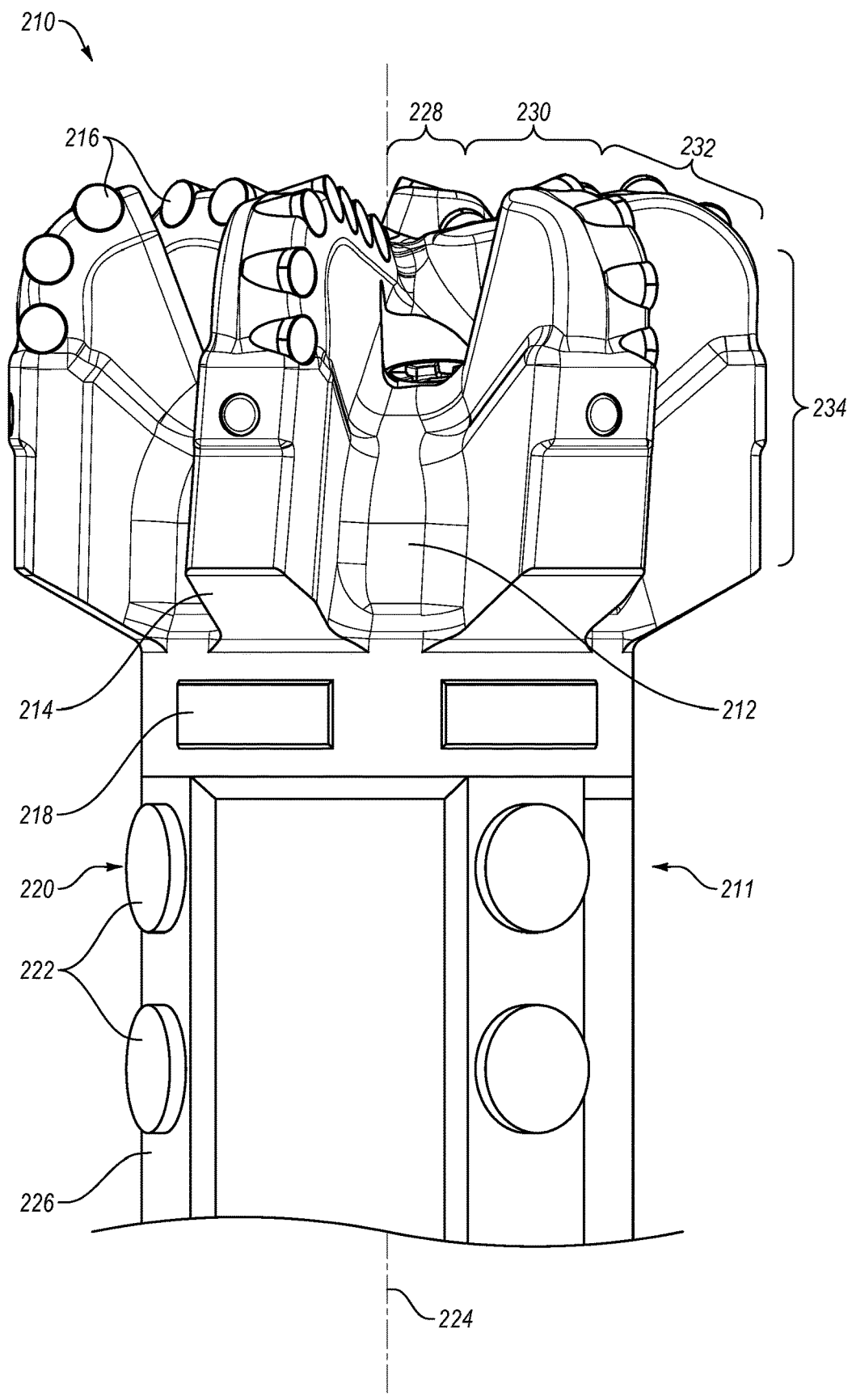
FIG. 2 is a side view of a bit coupled to a rotary steerable system, according to at least one embodiment of the present disclosure.

FIG. 2 is a perspective view of the downhole end of a bit 210, according to some embodiments of the present disclosure. The bit 210 in FIG. 2 is an example of a fixed-cutter or drag bit, and includes a bit body 212, and a plurality of blades 214 extending radially and azimuthally therefrom. One or more of the blades 214—and potentially each blade 214—may have a plurality of cutting elements 216 connected thereto. In some embodiments, at least one of the cutting elements 216 has a planar cutting face. A planar cutting face may be used to shear the downhole materials, and such a cutting element may be considered a shear cutting element. In other embodiments, at least one of the cutting elements 216 has a non-planar cutting face. A non-planar cutting face may shear, impact/gouge, or otherwise degrade the downhole materials. Examples of non-planar cutting elements (i.e., cutting elements having a non-planar cutting face) include cutting elements with conical, ridged, domed, saddle-shaped, chisel-shaped, or other non-planar cutting faces. In some embodiments, the bit 210 includes one or more stabilizer pads 218. A stabilizer pad 218 may be located on a blade 214 or at other locations other than a blade 214, such as on the bit body 212.

In FIG. 2, the bit 210 is coupled to a rotary steerable system ("RSS") 211 that may be used to steer the bit 210 when forming or enlarging a wellbore. The RSS 211 may include one or more steering devices 220 that are selectively actuatable to steer the bit 210. In some embodiments, the steering device 220 includes one or more pistons 222 that are actuatable to move in a radially outward direction relative to a longitudinal axis 224 of the bit 210 and RSS 211. The RSS 211 may apply a force at an angle relative to the drilling direction of the bit 210 to deflect the drilling direction. For instance, the pistons 222 may apply a force at an angle that is about perpendicular to the longitudinal axis 224, or that is within 5°, 15°, or 30° of being perpendicular to the longitudinal axis 224. In some embodiments, the steering device 220 is or includes an actuatable surface or ramp that moves in a radial direction relative to the longitudinal axis 224. The bit 210 and RSS 211 may rotate about the longitudinal axis 224, and the one or more steering devices 220 may actuate in a timed manner with the rotation to steer the bit and form a directional wellbore, or to maintain a straight wellbore.

In some embodiments, a portion of the steering device 220 (e.g., a piston 222 or housing of the piston 222 is radially within an RSS body 226 when the steering device 220 is in a retracted position. In some embodiments, at least a portion of the steering device 220 (e.g., a piston 222 and/or a housing of the piston 222) may protrude from an RSS body 226 when the steering device 220 is in an expanded or retracted position. In some embodiments, one or more portions of the RSS 211 may experience greater wear and/or impact during operation.

The cutting elements 216 of the bit 210 may experience different wear rates in different regions of the bit body 212 or blades 214. In some embodiments, the cutting elements 216 of the bit 210 experience different wear rates at a cone region 228, a nose region 230, a shoulder region 232, or a gage region 234 of the blades 214. For example, the cutting elements 216 of the nose region 230 may experience higher wear rates than the cutting elements 216 of the gage region 234. In other examples, the cutting elements 216 of the shoulder region 232 experience higher wear rates than the cutting elements 216 of the nose region 230.

In some embodiments, the bit body 212, the blades 214, the RSS body 226, or combinations thereof include one or more body materials. The bit 208 and/or the RSS 211 may be or include a second material that is harder and/or has higher wear or erosion resistance than the body material. Conventionally, the second material may be a hardfacing material that is manually applied to the bit body 212, blades 214, or RSS body 226. Hardfacing may be applied to a steel bit to increase the wear and/or erosion resistance of certain areas on the bit and/or blades. Hardfacing is conventionally a manual process that melts hardfacing rods. The melted material is applied to the bit, and the material cools on the bit to have a final geometry. The hardfacing may be applied in layers. As a manual process, hardfacing is variable and may have defects that result in premature failure of the hardfacing and/or the hardfaced components at or near the defects. For example, the hardfacing may fail at boundaries, along compositional changes, at layers, or other inconsistencies in the hardfacing material. In other examples, the hardfacing delaminates from the bit and/or blades due to insufficient bond strengths between the hardfacing material and the bit and/or blades. In some embodiments of a cutting tool according to the present disclosure, one or more portions of a bit 210 and/or RSS 211 include gage protection or other inserts positioned in the bit and/or blades and affixed to the bit and/or blade. The inserts may have a higher wear and/or erosion resistance than adjacent bit material to prolong the operational lifetime of a tool that may not include hardfacing.

Figure 3:
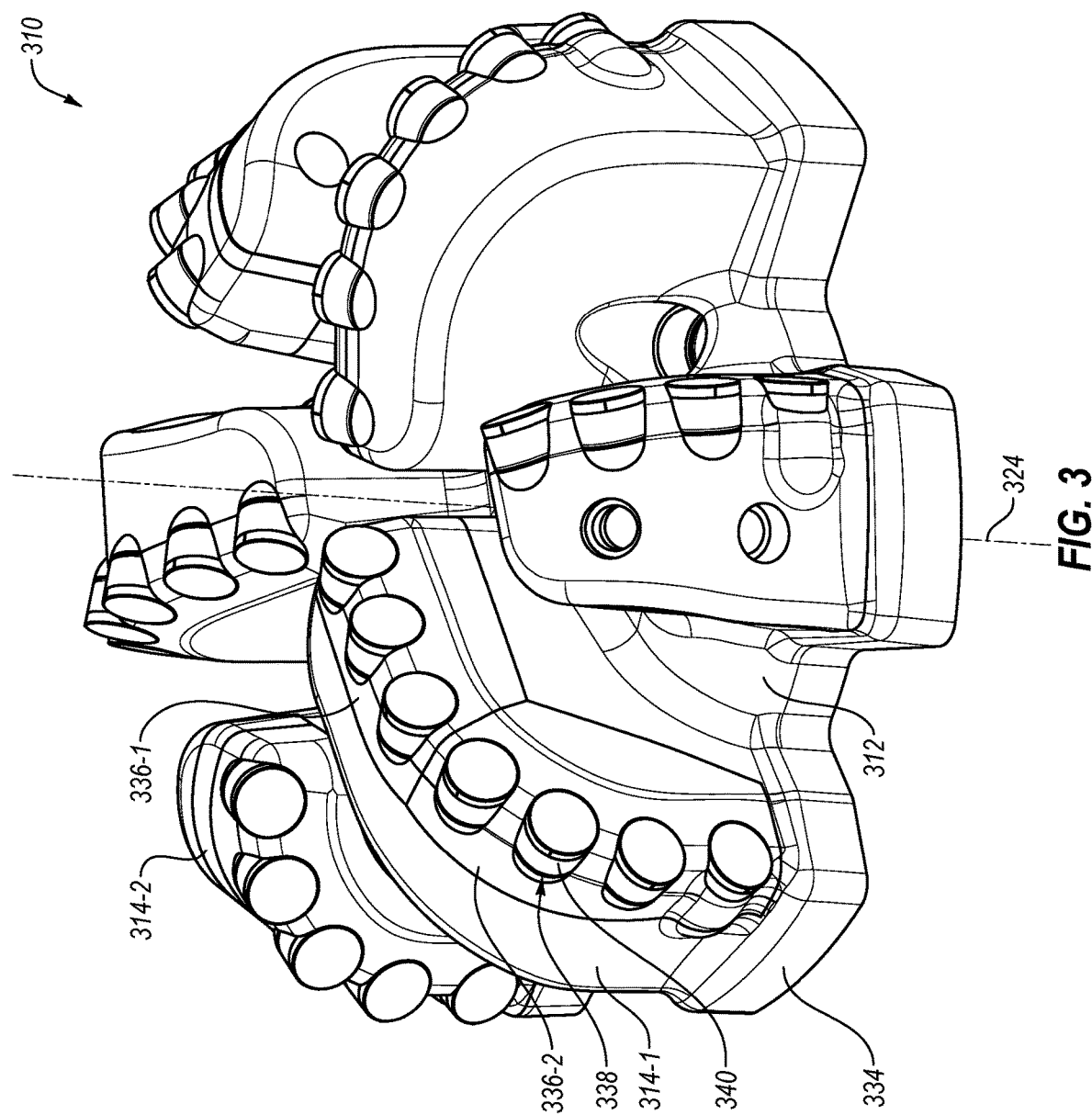
FIG. 3 is a perspective view of a bit with replaceable cutting structure segments connected to a blade, according to at least one embodiment of the present disclosure.

FIG. 3 is a perspective view of a crown another embodiment of a bit 310 with a bit body 312 that includes a plurality of blades. In some embodiments, the bit body 312 includes one or more primary blades 314-1 and one or more secondary blades 314-2. In some embodiments, the primary blades 314-1 and secondary blades 314-2 both extend to the gage region 334 of the bit 310, but the primary blades 314 extend radially inward to be nearer the longitudinal axis 324 of the bit 310 when compared to the secondary blades 314. In some embodiments, tertiary blades are also included, which extend to the gage region, but are farther from the longitudinal axis 324 than are the secondary blades 314-2.

In some embodiments, a bit 310 includes at least one primary blade 314-1, secondary blade 314-2, or tertiary blade (collectively, blades 314), that includes one or more segments 336-1, 336-2 (collectively segments 336) coupled thereto. In some embodiments, the segments 336 are replaceable cutting element segments, and include one or more cutter pockets 338 therein. The segments 336 may define cutter pockets 338 that include a sidewall and optionally a base. In some embodiments, a cutting element 340 is positioned in the cutter pocket 338. While shear cutting elements 340 are shown in FIG. 3, the cutting element 340 may be any cutting element (e.g., a non-planar cutting element) described herein.

In some embodiments, a first segment 336-1 is coupled to a blade 314 (e.g., primary blade 314-1). The first segment 336-1 may be connected to the blade 314 by one or more connection mechanisms. For example, the first segment 336-1 may be connected to the blade 314 by welding, brazing, an adhesive, mechanical fastener(s) (e.g., bolts, screws, pins, clips, clamps, or other mechanical fasteners), mechanical interlock (e.g., grooves, dovetails, posts, recesses, ridges, other surface features, or other mechanical interlocks), other mechanisms, or combinations thereof. In some embodiments, the first segment 336-1 is brazed or welded to the blade 314. In other embodiments, the first segment 336-1 is at least partially coupled to the blade 314 with a mechanical interlock and partially with braze or weld.

In the same or other embodiments, a second segment 336-2 is coupled to the same blade 314 that has the first segment 336-1 coupled thereto. The second segment 336-2 may be coupled to the blade 314 by the same or different connection mechanism as the first segment 336-1. For example, the forces experienced by the first segment 336-1 in a first portion of the blade 314 may be different that the forces experienced by the second segment 336-2 in a second portion of the blade 314. In some examples, the forces applied during a cutting operation are, for instance, different at the nose or cone regions of the blade 314 (and at the first segment 336-1) than at the shoulder region of the blade 314 (and at the second segment 336-2). In some embodiments, different connection mechanisms are used at least partially due to the differing forces experienced during cutting operations.

In some embodiments, a segment 336 includes or is made of a segment material. The segment material may be different from a bit body material or a blade material. For example, the segment material may include a ceramic, carbide, diamond, or ultrahard material that is different than a ceramic, carbide, metal, metal alloy, or other material of the bit body or blade 314. An "ultrahard material" is understood to refer to those materials known in the art to have a grain hardness of 1,500 HV (Vickers hardness in kg/mm2) or greater. Such ultra-hard materials can include those capable of demonstrating physical stability at temperatures above 750° C., and for certain applications above 1,000° C., that are formed from consolidated materials. In some embodiments, the ultrahard material has a hardness values above 3,000 HV. In other embodiments, the ultrahard material has a hardness value above 4,000 HV. In yet other embodiments, the ultrahard material has a hardness value greater than 80 HRa (Rockwell hardness A). In some examples, the segment material includes a carbide material (e.g., tungsten carbide, tantalum carbide, titanium carbide, etc.). According to some embodiments, a carbide material forming the segment(s) 336 is infiltrated and/or sintered, or a cemented carbide material. In some embodiments, the carbide material is sintered and cemented (e.g., a sintered tungsten carbide including a binder and formed by additive manufacturing). In yet other examples, the segment material includes ultrahard particles embedded in a matrix material.

In some embodiments, the bit body material and/or blade material is a material with a lower erosion and/or wear resistance than the segment material. In other embodiments, the bit body material and/or blade material is a material with higher toughness than the segment material. In some examples, the bit body material and/or blade material includes a steel alloy and the segment material includes a tungsten carbide. The steel alloy may have a higher toughness than the tungsten carbide, which is more brittle, and the tungsten carbide may provide greater wear and/or erosion resistance during cutting operations.

Figure 4:
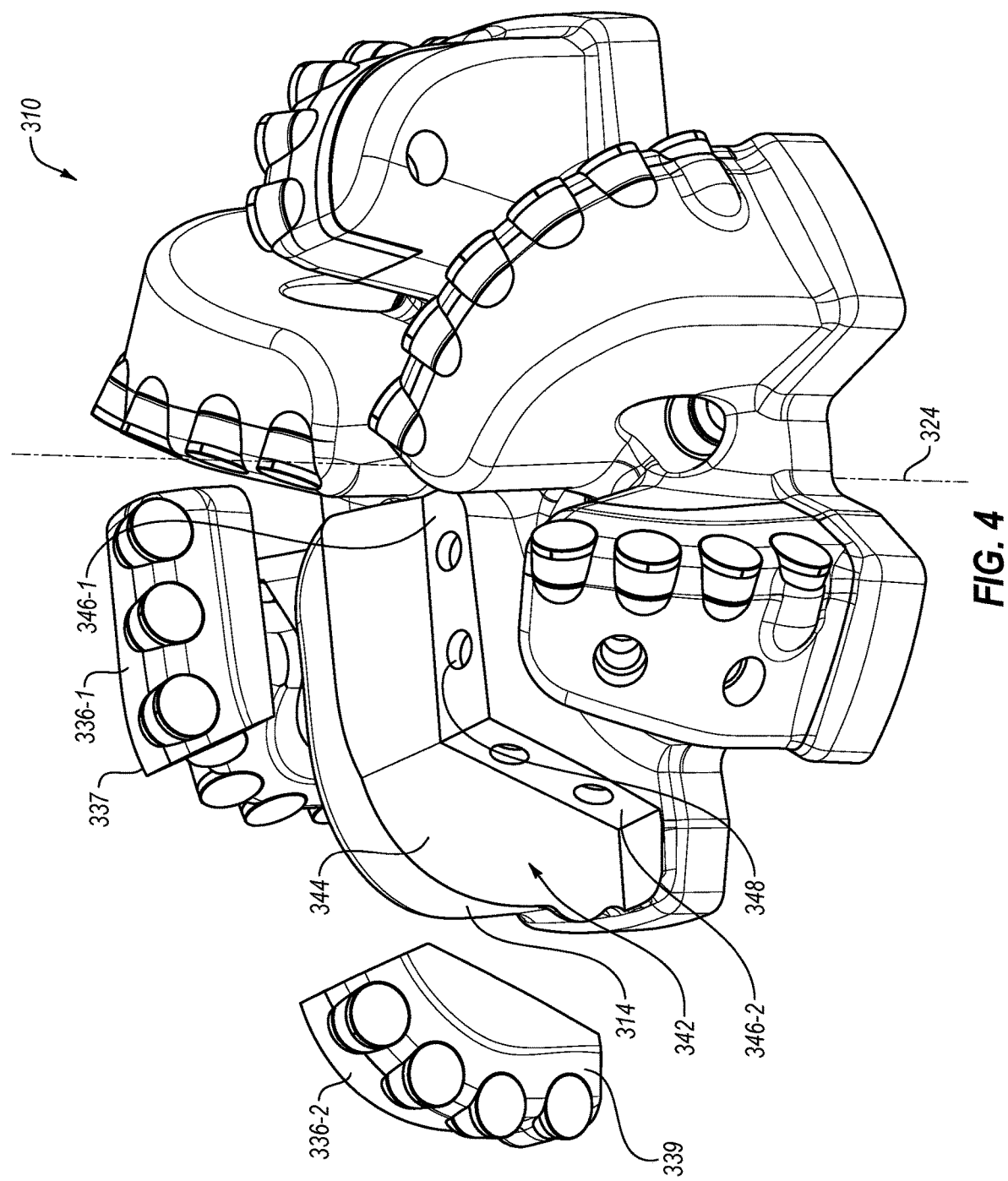
FIG. 4 is an exploded view of the bit of FIG. 3, according to at least one embodiment of the present disclosure.

As the segments 336 may experience shear and/or compressive forces during cutting operations, the connection of the segments 336 with the blade 314-1, 314-2 may include a variety of geometries and/or connection mechanisms. FIG. 4 is an exploded perspective view of the embodiment of a bit 310 in FIG. 3, in which the segments 336 are connectable to a blade 314. The blade 314 may be a primary blade 314-1 as shown in FIG. 4, or a secondary or tertiary blade in other embodiments.

In some embodiments, a void or recess 342 is formed in the blade 314, and configured to receive one or more of the segments 336. For instance, in FIG. 4, a recess 342 is formed in a rotationally leading face of the blade 314, and the first segment 336-1 and the second segment 336-2 is positioned at least partially within the recess 342 and connected to the blade 314 at an interface.

In some embodiments, the interface includes one or more back surfaces 344 and one or more side surfaces 346-1, 346-2. A back surface 344 may provide support to a segment 336. In particular, the back surface 344 may be formed in a blade 314 and configured to support a rear surface 337 of one or more of the segments 336. The rear surface 337 of the segments 336 may be opposite the rotationally leading surface 339 of the segments 336. The side surfaces 346-1, 346-2 may provide support to the segments 336 along one or more longitudinal and/or radial surfaces of the segments 336. The longitudinal and/or radial surfaces of the segments 336 may extend between the rear surface 337 and the rotationally leading surface 339 of a segment 336. For example, the first side surface 346-1 may be oriented about normal to the longitudinal axis 324, and during cutting operations, the first segment 336-1 may experience a longitudinal, compressive force from the formation and transmit that compressive force to the first side surface 346-1, which extends radially along the blade 314. The first side surface 346-1 may support the first segment 336-1 while receiving the compressive force. In other embodiments, the first side surface 346-1 is oriented at a different angle relative to the longitudinal axis 324, or is curved or have some other contour, shape, or orientation.

In the same or other embodiments, the second side surface 346-2 defining the recess 342 is oriented at an angle to the longitudinal axis 324 to provide support in the radial direction to the second segment 336-2. For example, during cutting operations, the second segment 336-2 may experience a compressive force optionally in both the longitudinal direction (in the direction of the longitudinal axis 324) and in a radial direction (normal to and toward the longitudinal axis 324). The second side surface 346-2 may extend in both radial and longitudinal directions and support the second segment 336-2 while receiving the longitudinal and radial compressive force. In some embodiments, the second side surface 346 extends longitudinally to be parallel to the longitudinal axis 324, is perpendicular to the longitudinal axis 324, is be curved, or has some other contour, shape, or orientation. Thus, the first and second side surfaces 346-1, 346-2 may be planar or non-planar.

In some embodiments, the back surface 344 supports the rear surface 337 of a segment 336 as the bit 310 rotates in the rotational direction (so that the leading surface 339 rotationally leads the rear surface 337) about the longitudinal axis 324. Shear, frictional, or other forces on the blades 314 from the formation or other downhole material may oppose the direction of movement of the bit 310—including the segments 336—during cutting operations. The back surface 344 defining the recess 342 may provide a compressive support against the shear and other forces from the formation. In some embodiments, the back surface 344 is planar, curved, or otherwise configured. In at least some embodiments, the back surface 344 is angled toward the rotational direction such that shear force applied to the segment 336-1, 336-2 is partially directed toward the bit body. For instance, the downhole end portion of the back surface 344 (i.e., the portion nearest the top of the blade 314) may be inclined toward (and nearer) the rotationally leading face of the blade 314. In other embodiments, the uphole end portion of the back surface 344 is inclined toward the rotationally leading face of the blade 314.

In some embodiments, the segments 336 are connected at the interface with the recess (and at the back surface 344 and/or side surfaces 346) with a connection mechanism. In FIG. 4, the connection mechanism includes mechanical interlocking features 348. In some embodiments, the mechanical interlocking features 348 include complementary recesses and posts. For instance, one or more recesses may be formed in the blades 314 and one or more complementary posts in the segments 336, or one or more recesses may be formed in the segments 336 and one or more posts in the blades 314. In another one or more embodiments, recesses are formed in each of the segments 336 and in the blades 314, and one or more complementary posts are formed separately and inserted into the recesses in both the segments 336 and the blades 314. In other embodiments, the mechanical interlocking features 348 include dovetails, tapered dovetails, ridges, grooves, or other surface features that limit and/or prevent the movement of a segment 336 relative to the blade 314 in one or more directions.

In some embodiments, the mechanical interlocking features 348 are positioned in a side surface 346 defining the recess 342. In the same or other embodiments, one or more mechanical interlocking features 348 are positioned in the back surface 344 defining the recess 342. In at least one embodiment, mechanical interlocking features 348 are positioned in both the side surfaces 346 and the back surface(s) 344 defining the recess 342. For example, a dovetail feature in the back surface 344 may allow a segment 336 to slide along the dovetail, and potentially until a post engages with a recess in a side surface 346. In some embodiments, mechanical interlocking features 348 or other surface features assist in aligning a segment 336 with a location within the recess 342. In some examples, mechanical interlocking features 348 limit and/or prevent movement of a segment 336 relative to the blade 314-1 during a brazing, welding, or other attachment process. In other examples, a first segment 336-1 and a second segment 336-2 have different mechanical interlocking features 348, or have different shapes, to preventing incorrect placement and installation of the segments 336.

In some embodiments, at least a portion of the side surfaces 346 is planar. A planar side surface 346 may provide a stronger connection between the interface of the recess 342 and the replaceable segments 336. For example, the planar side surface 346 adjacent the segments 336 of the embodiment shown in FIG. 4 allows for more reliable brazing of the first segment 336-1 to the blade 314 and of the second segment 336-2 to the blade 314. In other embodiments, a planar side surface 346 reduces or eliminates stress concentrations within the corresponding side surface 346. In some embodiments, there is a discontinuous angle between a first side surface 346-1 and a second side surface 346-2.

Figure 5:
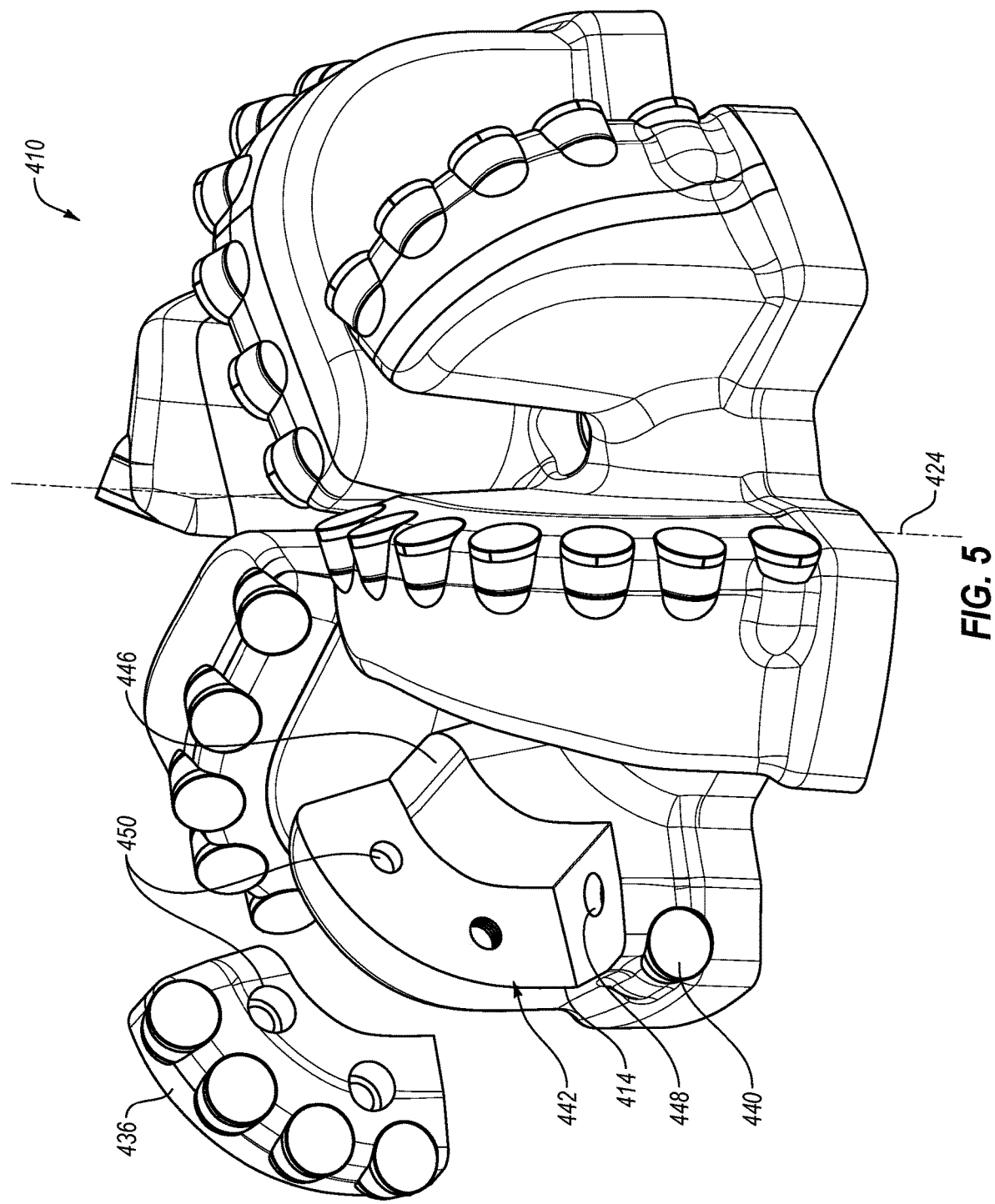
FIG. 5 is an exploded view of another bit with replaceable cutting structure segments connected to a blade, according to at least one embodiment of the present disclosure.

FIG. 5 is an exploded view of another embodiment of a bit 410 having a segment 436 positioned in a recess 442 in a blade 414. In some embodiments, a cutting element 440 is positioned in the cutter pocket of the blade 414. Although the blade 414 is shown as a secondary blade, the segment 436 may be used in connection with a primary, tertiary, or other blade. The primary blades 414 extend radially inward to be nearer the longitudinal axis 424 of the bit 410 when compared to the secondary blades 414. In some embodiments, at least part of an interface defined by a recess 442 within the blade 414 and the segment 426 is curved. For instance, a full or partial portion of a side surface 446 may be curved or otherwise non-planar. In other examples, a portion of the side surface 446 is curved and another portion of the side surface 446 is planar.

In some embodiments, a curved portion of the side surface 446 has a radius of curvature in a range having an upper value, a lower value, or upper and lower values including any of 5 mm, 20 mm, 40 mm, 50 mm, 60 mm, 80 mm, 100 mm, or any values therebetween. For example, the curved portion of the side surface 446 may have a radius of curvature greater than 5 mm. In other examples, the curved portion of the side surface 446 has a radius of curvature less than 100 mm. In yet other examples, the curved portion of the side surface 446 has a radius of curvature between 5 mm and 100 mm. In further examples, the curved portion of the side surface 446 has a radius of curvature between 10 mm and 80 mm. In yet further examples, the curved portion of the side surface 446 has a radius of curvature 25 mm. In still other embodiments, the radius of curvature of the side surface 446 is less than 5 mm or greater than 100 mm. Additionally, the radius of curvature of the side surface 446 may vary or may be constant.

In some embodiments, a segment 436 is connected to the blade 414 with a mechanical fastener, either alone or in combination with other connection methods. For example, a segment 436 and blade 414 may include one or more mechanical fastener connection locations 450. For example, a mechanical fastener connection location 450 may include a threaded hole (blind hole or through hole) to receive a threaded mechanical fastener, or an unthreaded through hole. In the same or other examples, a mechanical fastener connection location 450 includes a hole or recess with a shoulder (e.g., a countersunk bore having a first diameter and a larger second diameter with a step therebetween) to receive a nut, the head of a bolt, or other complimentary mechanical fastener. In at least one example, a mechanical fastener connection location 450 in a segment 436 has a shoulder to engage with a head of a threaded bolt, and a mechanical fastener connection location 450 in a blade 414 has a threaded bore to engage with threads of the threaded bolt. The threads may engage to allow the head of the bolt to compress the segment 436 toward the interface with the blade 414. In FIG. 5, the connection mechanism of the segment 436 and the blade 414 includes mechanical interlocking features 448. In some embodiments, the mechanical interlocking features 448 include complementary recesses and posts.

Figure 6:
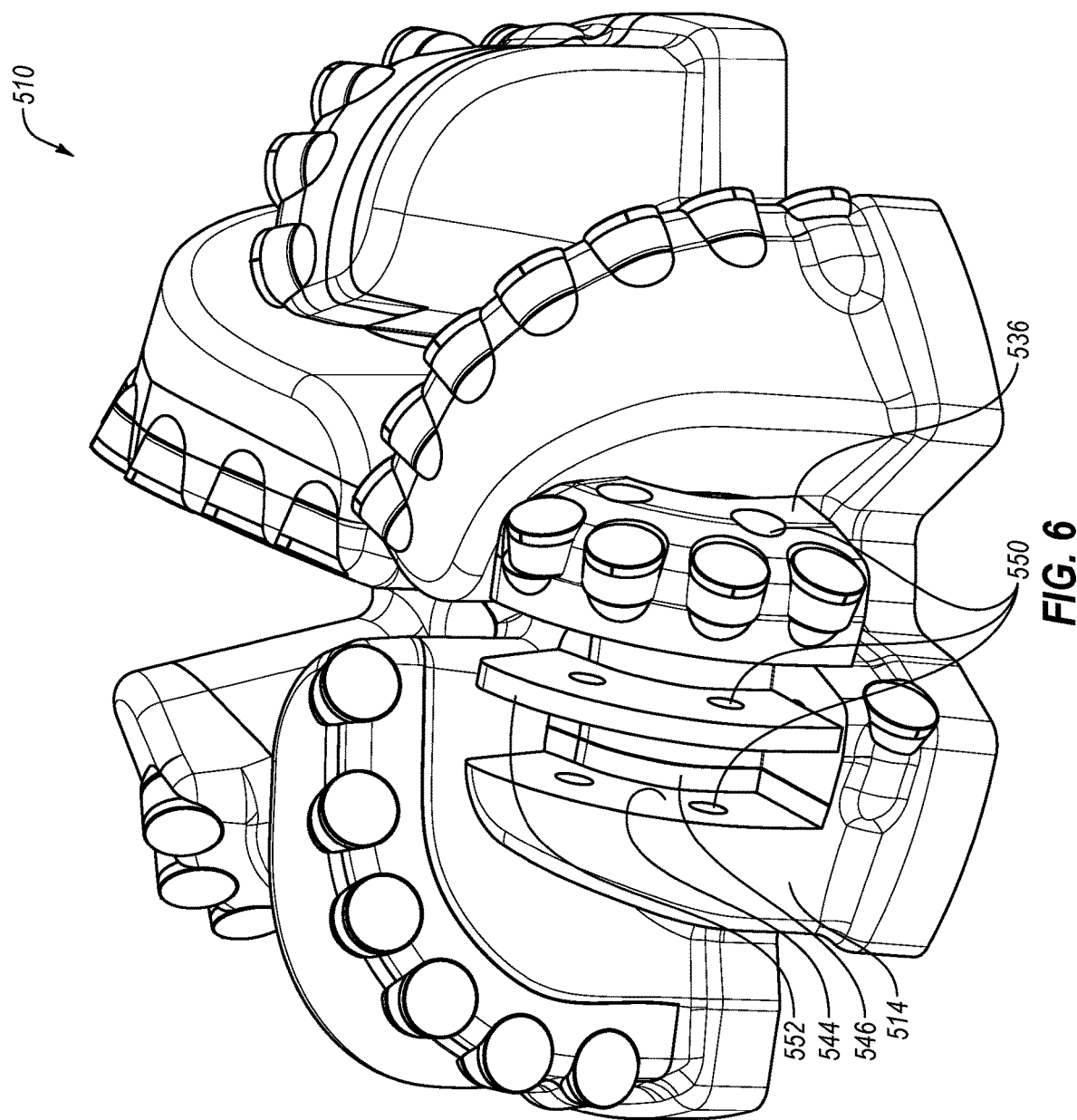
FIG. 6 is an exploded view of a bit with a resilient, energy absorption layer between a replaceable cutting structure segment and a blade, according to at least one embodiment of the present disclosure.

FIG. 6 is a perspective exploded view another embodiment of a bit 510 with a modular or replaceable segment 536 configured to connect to a primary blade, a secondary blade, or some other blade 514, using one or more mechanical fastener connections. For example, a segment 536 and blade 514 may include one or more mechanical fastener connection locations 550. The segment 536 may be compressed against a back surface 544 and/or side surface 546 by mechanical fasteners. In some embodiments, a resilient, energy absorption layer 552 is positioned between the segment 536 and the blade 514. The resilient layer 552 may be any material that may deform under compression between the segment 536 and the blade 514. For example, the resilient layer 552 may include an elastically compressible material, such as a spring steel, titanium alloy, other metal alloy, a polymer, a composite material, or other material, that may deform plastically or elastically. In some embodiments, the resilient layer has a bulk elastic modulus below 630 GPa. In other examples, the resilient layer 552 includes a geometry that allows for compression of the resilient layer 552. For example, the resilient layer 552 may include a leaf spring geometry to apply a reactive force to the compression of a mechanical fastener.

According to some embodiments, mechanical fasteners may loosen during cutting operations due, at least partially, to vibrations incurred during cutting of the formation, casing, or other material. In some embodiments, a resilient layer 552 may limit and/or prevent the "walking out" of a mechanical fastener during cutting operations. In other embodiments, a resilient layer 552 may dampen the transmission of vibration from the segment 536 to the blade 514, thereby reducing fatigue damage to the blade 514. In the same or other embodiments, an elastic or inelastic resilient layer 552 may absorb impacts between the segment 536 and the blade 514, reducing damage to the segment 536 and/or blade 514. In further embodiments, a resilient layer 552 may provide a compliant layer between the segment 536 and the blade 514 that may reduce stress concentrations that arise from any mismatch between contact faces of the segment 536 and the blade 514.

Figure 7:
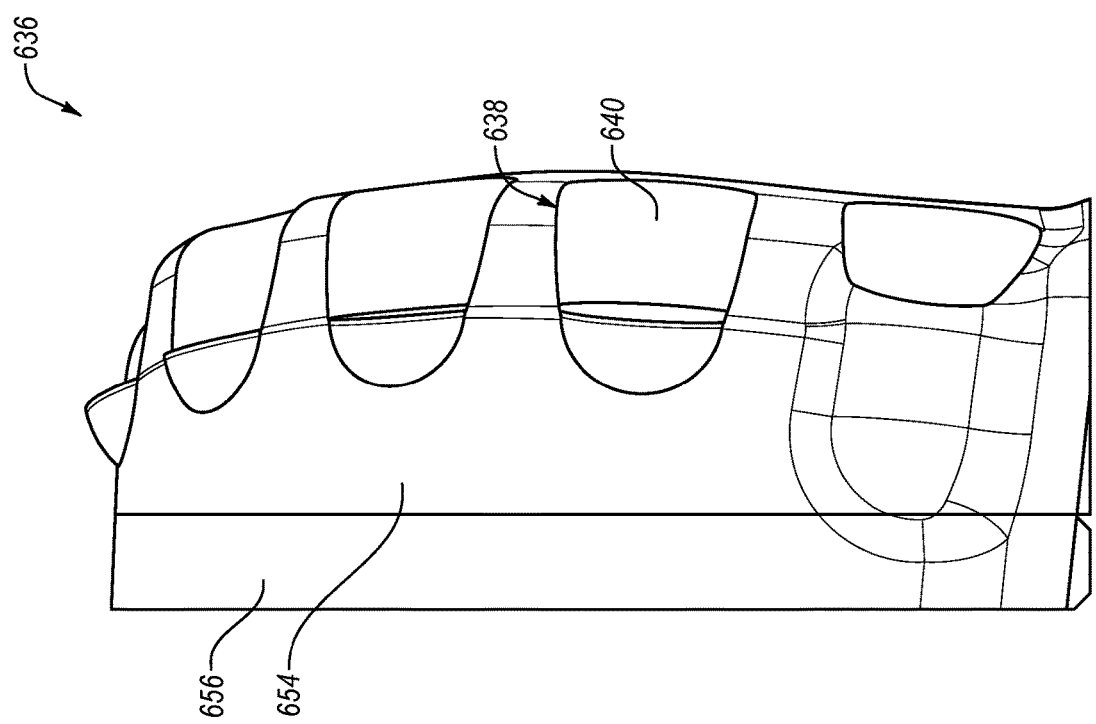
FIG. 7 is a side view of a replaceable cutting structure segment that includes a plurality of materials, according to at least one embodiment of the present disclosure.

In other embodiments, a resilient or other layer is part of the segment. FIG. 7 is a side view of another embodiment of a segment 636 having two materials bonded to one another. The segment 636 may include a segment material and a substrate material that are metallurgically bonded or mechanically fastened. In some embodiments, a segment 636 is additively manufactured with a segment material layer 654 deposited on and bonded to a substrate material layer 656. The substrate material layer 656 may be a metal alloy, such as steel, aluminum, titanium, or other metal alloy. In some embodiments, the substrate material is a weldable material. For example, a segment 636 with a steel substrate material layer 656 may be weldable to a weldable material (e.g. steel) of a blade of a bit or other cutting tool.

In some embodiments, the segment 636 includes one or more cutter pockets 638, which have cutting elements 640 positioned therein. In some embodiments, the cutter pockets 638 are located at least partially in the segment material layer 654 of the segment 636. In other embodiments, the cutter pocket 638 is located entirely in the segment material layer 654 of the segment 636. In yet other embodiments, the cutter pocket 638 is located at least partially in the substrate material layer 656 of the segment 636. In some embodiments, a thickness of the substrate material layer 656 is at least 0.05 in. (1.27 mm), at least 0.1 in. (2.54 mm), at least 0.2 in. (5.08 mm), or at least 0.3 in. (7.62 mm). In other embodiments, the substrate material layer 656 is less than 0.05 in. (1.27 mm).

In some embodiments, a segment includes side and rear surfaces defining a cutter pocket within the segment. In other embodiments, a segment has a side surface extending fully and no rear surface, so that the cutter pocket extends fully through the segment from a first face to an opposing second face, such that the cutter pocket is open on both sides. In such embodiments, the blade defines at least a portion of the cutter pocket (e.g., a rear surface and/or a portion of one or more side surfaces), and the cutting element is at least partially connected directly to the blade of the bit, without the segment forming a purely indirect connection between the cutting element and the blade.

Figures 1, 8:
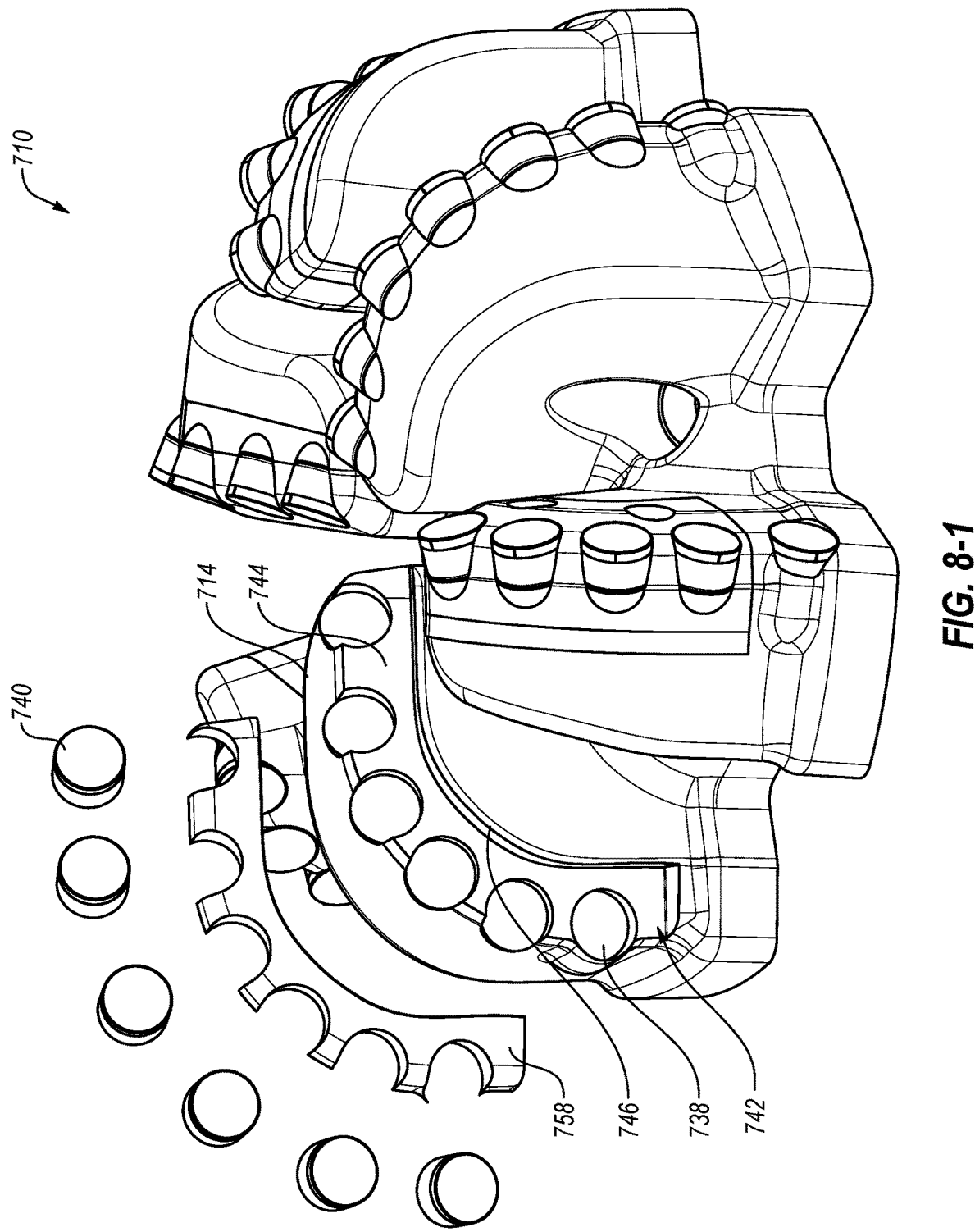
Figures 2, 8:
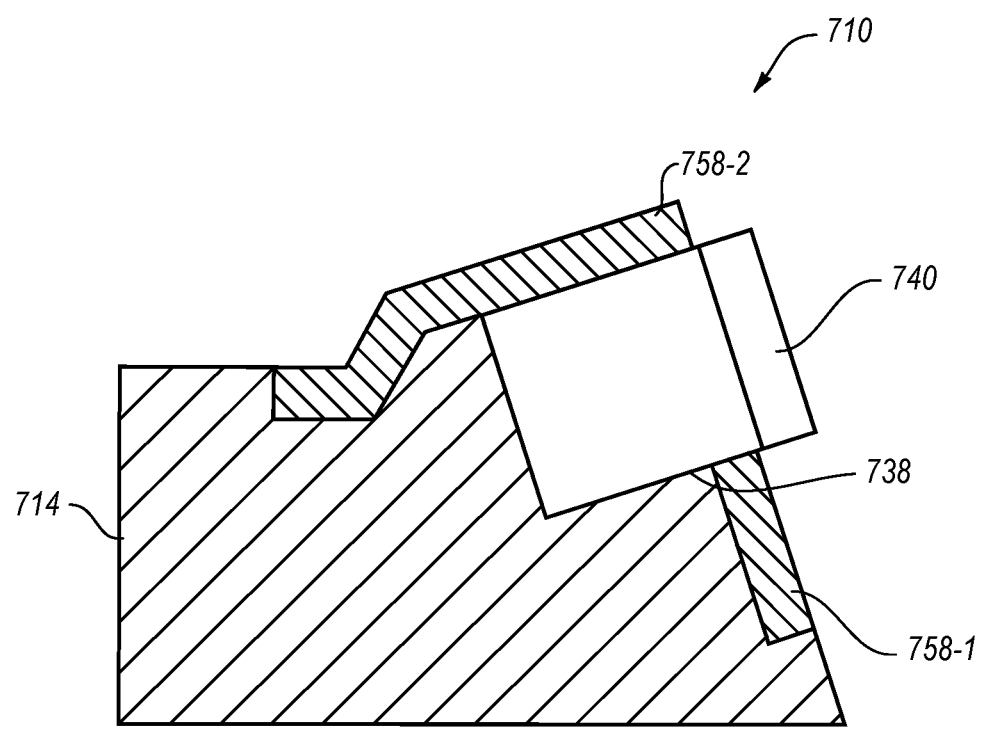

FIG. 8-1 is an exploded perspective view of an example embodiment of a bit 710 with cutter pockets 738 formed in a blade 714 (e.g., primary blade, secondary blade, tertiary blade, etc.) of the bit 710, while a protective segment is positioned adjacent the cutter pockets 738 and the cutting elements 740. In some embodiments, the protective segment includes a faceplate 758 that couples to a leading face of the blade 714 of the bit 710. The faceplate 758 may be may be similar in some respects to segments described in relation to FIG. 2 through FIG. 7. For example, a faceplate 758 may include a segment material, such as tungsten carbide. In other examples, a faceplate 758 includes a substrate material that is optionally a weldable material. In yet other examples, a faceplate 758 includes one or more mechanical fasteners or connection locations to facilitate coupling of the faceplate 758 to the blade 714.

The faceplate 758 may be positioned at an interface with the blade 714, and optionally within a recess 742 formed in the leading surface of the blade 714. While the faceplate 758 is shown positioned adjacent the leading face of a primary blade 714, in other embodiments, the faceplate 758 is positioned adjacent other blades of the bit 710 (e.g. secondary blades), or on other surfaces of a blade (e.g., a top surface as shown in FIG. 8-2). In some embodiments, the recess 742 may define an interface including a back surface 744 and a side surface 746. In some examples, at least a portion of the side surface 746 is curved or non-planar. In other examples, at least a portion of the side surface 746 is planar.

In some embodiments, the back surface 744 of the interface between the faceplate 758 and the blade 714 has part of one or more cutter pockets 738 positioned therein. For example, a base, back, or rear surface of the cutter pocket 738 may be at least partially within the blade 714. In some examples, at least some of a depth of the cutter pocket 738 is located in the blade 714, so that the side surface of the cutter pocket 738 is at least partially formed by the blade 714 and at least partially by the faceplate 758. The blade 714 and the faceplate 758 may therefore cooperatively define the cutter pocket 738 when the faceplate 758 is positioned relative to the blade 714 to align respective portions of the cutter pocket 738.

In some embodiments, a cutting element 740 is positioned in the cutter pocket 738 and is connected to both the blade 714 and to the faceplate 758. For example, the cutting element 740 may be brazed into the cutter pocket 738 such that the cutting element 740 is brazed to both the blade 714 and to the faceplate 758. In other embodiments, the cutting element 740 is brazed to the blade 714 and not to the faceplate 758. In yet other embodiments, the cutting element 740 is brazed to the faceplate 758 and not to the blade 714.

In still other embodiments, attachment mechanisms other than brazing are used to couple the cutting element 740 to the blade 714, the faceplate 758, or both.

In at least some embodiments, the faceplate 758 is pre-formed to replace hardfacing applied by conventionally welding/melting process. In this context, a "pre-formed" faceplate 758 has a shape suitable for application, adhesion, or coupling to a bit or other downhole tool, even in the absence of melting the material. Thus, in contrast to conventional hardfacing that is melted to be applied to the bit, the pre-formed faceplate 758 has a defined shape apart from the downhole tool that is generally similar to the shape of the faceplate 758 when coupled to the downhole tool. Additionally, while conventional hardfacing adheres to a downhole tool using material within the hardfacing itself, a pre-formed faceplate 758 may be attached by a separate material (e.g., braze, solder, etc.) or a separate mechanism (e.g., mechanical fasteners).

The faceplate 758 may be formed from carbide, ceramic, matrix, metal, metal alloy, or other materials having a higher abrasion or erosion resistance than materials forming the blade 714. By way of example, a casting, infiltration, molding, additive manufacturing, sintering, machining, or other process, or a combination of the foregoing, may be used to produce faceplate 758 made at least partially, and potentially fully, of a sintered, cemented tungsten carbide material. The faceplate 758 may be coupled to a blade of a steel body bit. Due to the higher abrasion and erosion resistance of the sintered, cemented tungsten carbide material as compared to the steel material of the blade, the faceplate 758 may act as a pre-formed, and potentially replaceable material that may replace hardfacing material to protect areas of the blade of the bit 710 adjacent the cutting elements 740. This may allow the operational life of the bit 710 to be extended as wear from contact with formation and other materials, and erosion from fluid flow from nozzles or a wellbore, may be reduced. As wear of the faceplate 758 increases beyond an acceptable level, the faceplate 758 may be removed and replaced. Optionally, the cutting elements 740 may also be removed; however, in at least some embodiments, one or more of the cutting elements 740 may remain coupled to the blade 714 while the faceplate 758 is removed, and optionally while a replacement faceplate 758 is attached. In at least some embodiments, the faceplate 758 is coupled to the blade 714 by brazing, welding, or mechanical fastening. The faceplate 758 may optionally be coupled with a braze material that is different than the braze material used for brazing the cutting elements 740. In at least one embodiment, the braze material used to braze the faceplate 758 to the blade 714 has a higher melting temperature than the braze material used to braze the cutting elements 740 within the cutter pockets 738.

FIG. 8-2 is a schematic, partial cross-section of another example of a blade 714 having multiple faceplates coupled to the blade 714. In the embodiment shown in FIG. 8-2, a first pre-formed faceplate 758-1 is shown as being coupled to a leading surface of the blade 714, while a second pre-formed faceplate 758-2 is coupled to a top (or downhole or formation facing) surface of the blade 714. The first pre-formed faceplate 758-1 may be similar to the faceplate 758 of FIG. 8-1, and is optionally positioned within a recess in the leading face of the blade 714. As shown in FIG. 8-2, the first faceplate 758-1 may form at least a portion of a side surface of a cutter pocket 738 into which a cutting element 740 is positioned, while the blade 714 may also form a portion of the side surface of the cutter pocket 738, as well as a base of the cutter pocket 738.

In FIG. 8-2, a second faceplate 758-2 is coupled to the blade 714 in a manner similar to the first faceplate 758-1, except that the second faceplate 758-2 is located at the top surface of the blade 714, and optionally adjacent the cutting element 740. In the particular embodiment shown, the second faceplate 758-2 may cover at least a portion of the cutting element 740 to also define a portion of the cutter pocket 738; however, such an embodiment is merely illustrative. In other embodiments, the second faceplate 758-2 is positioned rotationally behind the cutting element 740 on the blade 714. The second faceplate 758-2 may provide increased abrasion or erosion resistance to the top, formation-facing surface of the blade 714 as drilling occurs. In some embodiments, the second faceplate 758-2 is positioned at least partially within a recess formed in the top surface of the blade 714; however, in other embodiments, the second faceplate 758-2 is wholly within a recess, or may not be within any recess at all.

Figure 9:
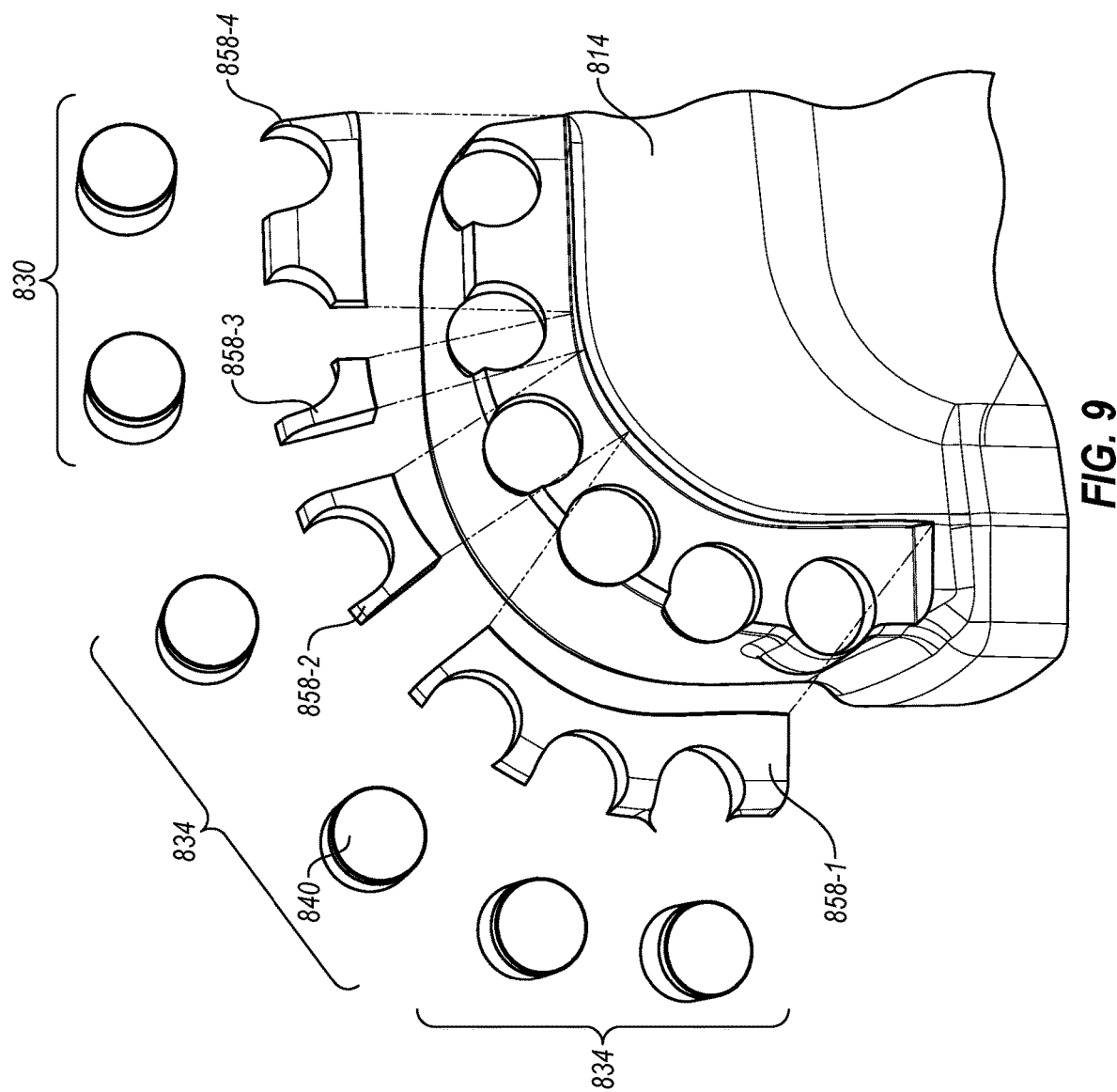
FIG. 9 is an exploded view of a blade with a plurality of pre-formed hardened faceplates positioned on the blade, according to at least one embodiment of the present disclosure.

FIG. 9 is an exploded view of another embodiment of a blade 814 with a faceplate coupled thereto. In some embodiments, the faceplate includes a plurality of faceplate segments 858-1, 858-2, 858-3, 858-4 (collectively faceplate segments 858) that are coupled to the blade 814. In an example, a first faceplate 858-1 may be configured to be positioned adjacent to and/or protect a plurality of cutting elements 840. The first faceplate 858-1 may be continuous across a distance adjacent to multiple cutting elements, and may reduce openings or edges that may be susceptible to increased erosion or wear rates. In other examples, at least one faceplate, such as the second faceplate segment 858-2 of FIG. 9, is configured to be positioned adjacent to and/or protect a blade adjacent a single cutting element 840. As should be appreciated in view of the disclosure herein, a faceplate segment 858 may be positioned adjacent to and/or protect a blade adjacent any number of cutting elements 840, including partial portions of cutting elements 840. Third faceplate segment 858-3, for instance, may be positioned adjacent half of a cutting element 840. Fourth faceplate segment 858-4 is shown as being positioned adjacent to and/or to protect a blade adjacent one and a half cutting elements 840.

In some embodiments, having separate faceplates that are not connected to one another may allow for the relief of residual thermal or other mechanical stress in the faceplate. Allowing the second faceplate segment 858-2 to thermally expand or contract independently of the third faceplate segment 858-3 may reduce the likelihood of failure of the second faceplate segment 858-2 and/or third faceplate segment 858-3. In other embodiments, having separate faceplates or faceplate segments that are not connected to one another may allow for the replacement or repair of individual faceplates as different regions of the blade 814 may experience different amounts of erosion or wear.

In some examples, the fourth faceplate segment 858-4 located on the nose region 830 of the blade 814 may experience a different wear/erosion rate than the second faceplate segment 858-2 located on the shoulder region 832 of the blade 814. In other examples, the gage region 834 of the blade 814 may experience a substantially equal wear rate along a length of the gage 834. In such examples, the gage region 834 may have a continuous first faceplate segment 858-1 such that there are no spaces or openings in the first faceplate segment 858-1 to increase operational lifetime of the gage region 834 with less risk of disproportionate wear/erosion on the first faceplate segment 858-1.

In some embodiments, a faceplate has a different geometry based on the type of cutting element the faceplate protects. For example, a faceplate may have a first geometry when configured to protect a shear cutting element and another faceplate may have a second geometry when configured to protect a non-planar cutting element. A blade 814 with a plurality of faceplates may allow for one of more of the faceplates 858 to be changed, allowing the blade 814 and/or associated bit to be customized to the material to be degraded. A variety of faceplates and combinations of faceplate segments allow a single bit and/or blade design to be modular. In at least some embodiments, the faceplates or faceplate segments may provide pre-formed, hardened elements that replace hardfacing applied to one or more areas of the blade surface on a steel or other bit. As should be appreciated in view of the disclosure herein, the separable, modular segments of FIG. 9 may also be used in connection with faceplates used on regions other than a rotationally leading surface, including with a faceplate on a top surface of a blade as discussed with respect to FIG. 8-2.

Figure 10:
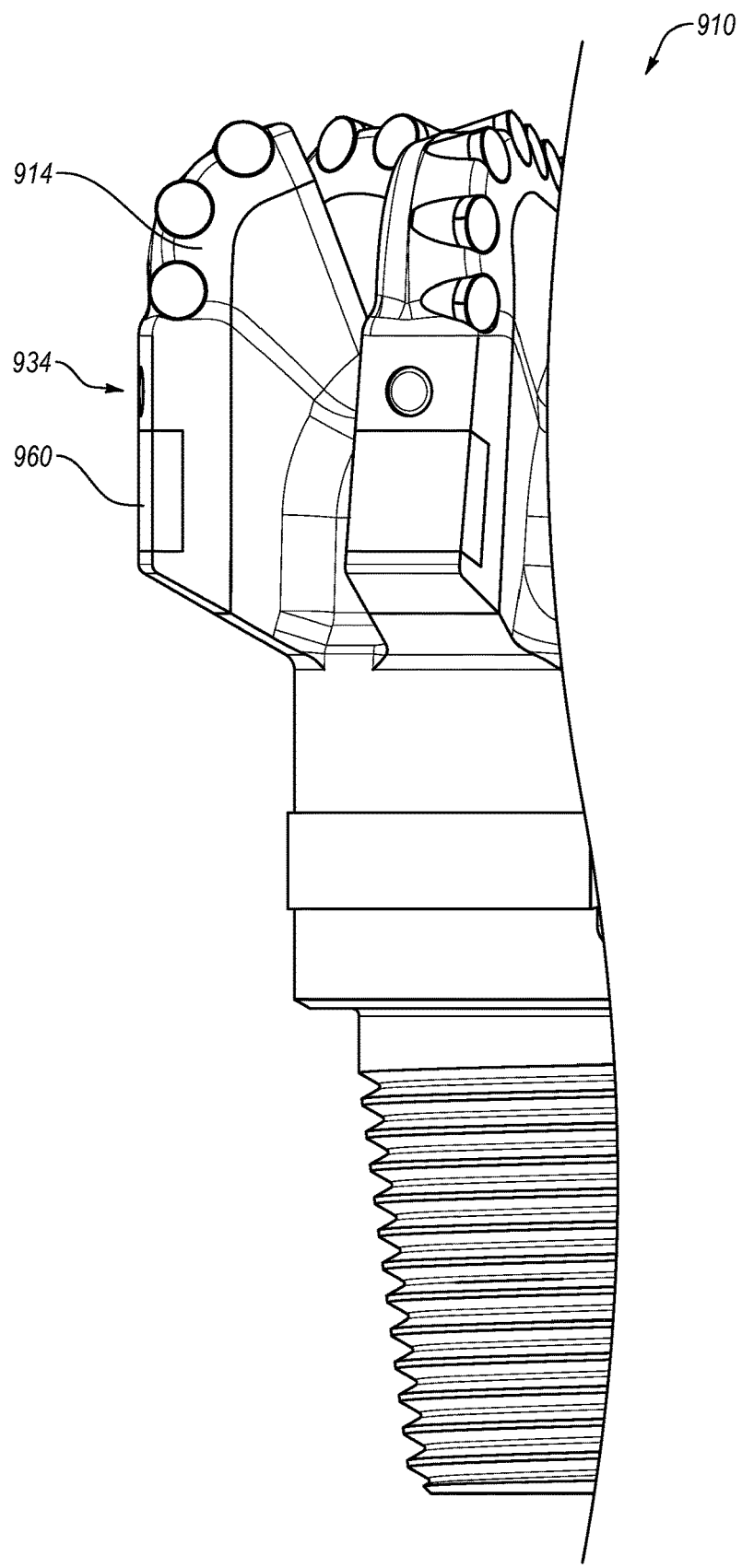
FIG. 10 is a partial side view of a bit with a replaceable segment displaced from the cutting elements, according to at least one embodiment of the present disclosure.

FIG. 10 is a side view of another embodiment of a bit 910 having a pre-formed, wear resistant insert 960 positioned in a gage region 934 of the bit 910. The insert 960 may include a segment material as described herein. In some embodiments, the insert 960 is positioned in the blade 914 to provide increased wear resistance in comparison to a body material of the blade 914. The insert 960 may be located in the blade in a void or recess, similar to the void or recess described in relation to FIG. 4. The insert 960 may provide a surface without pockets, or without pockets for cutting elements (in contrast to the cutting element-bearing segments of the embodiments describe in relation to FIG. 2 through FIG. 7) and/or be located on a non-cutting portion of the bit 910 (in contrast to the faceplate 758 located adjacent the cutting elements 740 in FIGS. 8-1 and 8-2). While embodiments include an insert 960 brazed into the blade 914, in other embodiments, an insert 960 is connected to the blade 914 using welding, an adhesive, a mechanical fastener (such as a bolt, screw, pin, clip, clamp, or other mechanical fasteners), a mechanical interlock (such as grooves, dovetails, posts, recesses, ridges, other surface features, or other mechanical interlocks), other mechanisms disclosed herein or known in the art, or combinations thereof.

Figure 11:
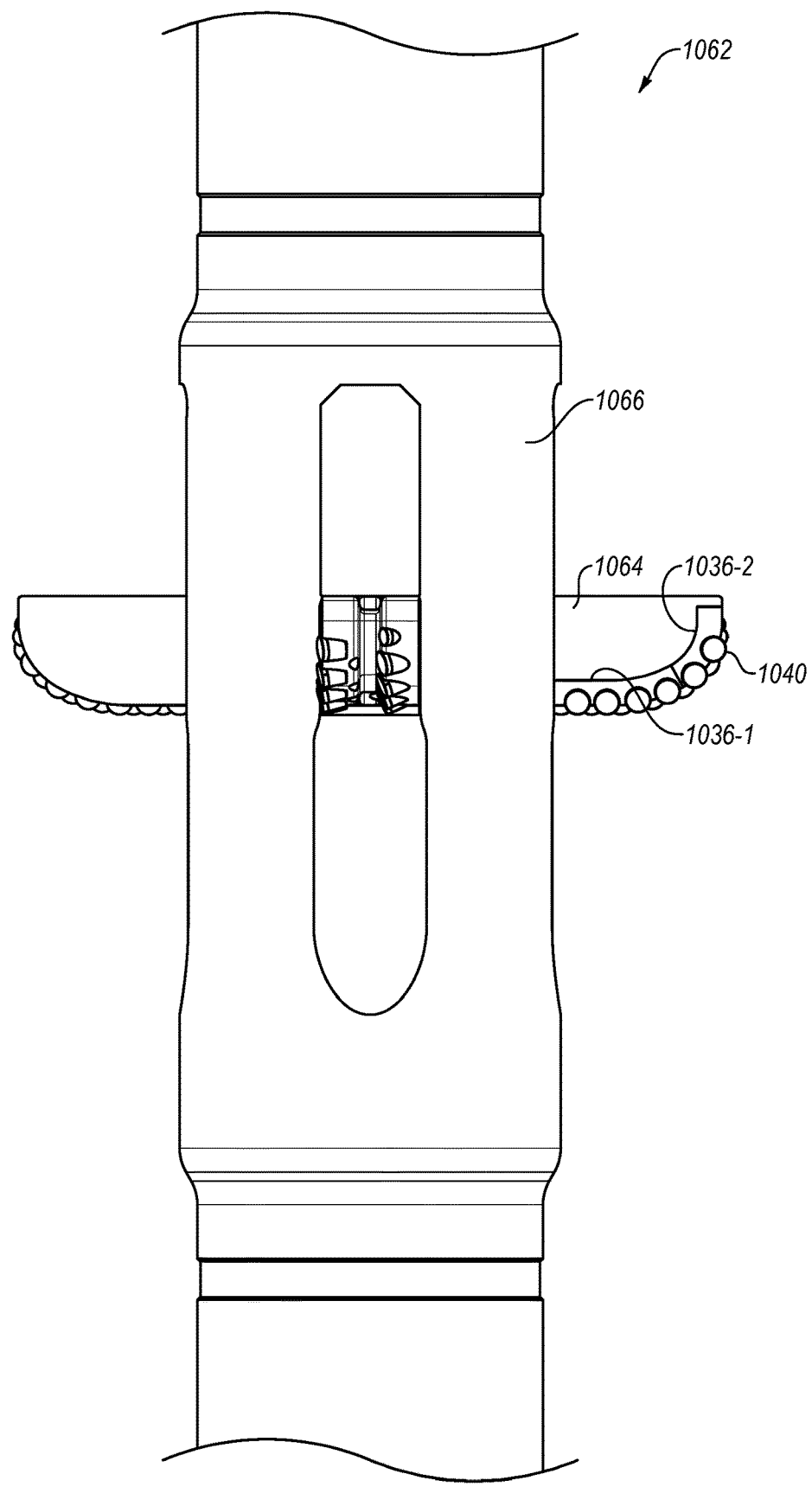
FIG. 11 is a side view of a downhole cutting tool including one or more replaceable cutting structure elements coupled to an expandable cutting arm, according to at least one embodiment of the present disclosure.

In other embodiments, pre-formed segments (including pre-formed hardened segments in lieu of hardfacing) are used in conjunction with cutting tools other than bits. For example, FIG. 11 is a side view of an embodiment of a downhole cutting tool 1062 illustrative of an expandable milling tool or underreamer 1066, with a plurality of segments 1036-1, 1036-2. A downhole cutting tool 1062 may be used in milling applications to remove casing from a wellbore or other downhole environment, or in underreaming applications to degrade formation or cement. The downhole cutting tool 1062 may have one or more cutting arms or blades 1064. In some embodiments, the blades 1064 are selectively deployable at the intended location in the wellbore. The blades 1064 may have a plurality of cutting elements 1040 positioned on a radially outward portion of the blade 1064, which portion is configured to remove casing and/or formation. For example, a combination of different cutting elements 1040 may be used on the blade 1064 depending on the location on the blade 1064. In some examples, a first segment 1036-1 carries and/or protects one or more cutting elements 1040 that are configured to cut steel casing. In other examples, a second segment 1036-2 carries and/or protects one or more cutting elements 1040 configured to cut cement or earthen formation. In yet other examples, the blade 1064 has one continuous segment that carries a plurality of types of cutting elements 1040, or a continuous segment or multiple segments carries a single type of cutting element 1040. In some embodiments, multiple types of cutting elements carried by the blade 1064 include stabilizing or gage protection elements in addition to cutting elements.

In some embodiments, a downhole cutting tool 1062 experiences different wear rates in different locations on the blade 1064 due, at least partially to different areas of the blade 1064 interacting with different materials, carrying a higher burden for material removal, experiencing different vibrational/impact forces, or myriad other reasons. For example, the wear rate of the first segment 1036-1 while cutting casing may be greater than the second segment 1036-2 while cutting cement or earthen formation. In another example, the wear rate of the second segment 1036-2 may be greater than the first segment 1036-1 while both ream earthen formation. In at least one embodiment, it is beneficial to selectively replace or repair one of the segments 1036-1, 1036-2 at a time.

Figure 12:
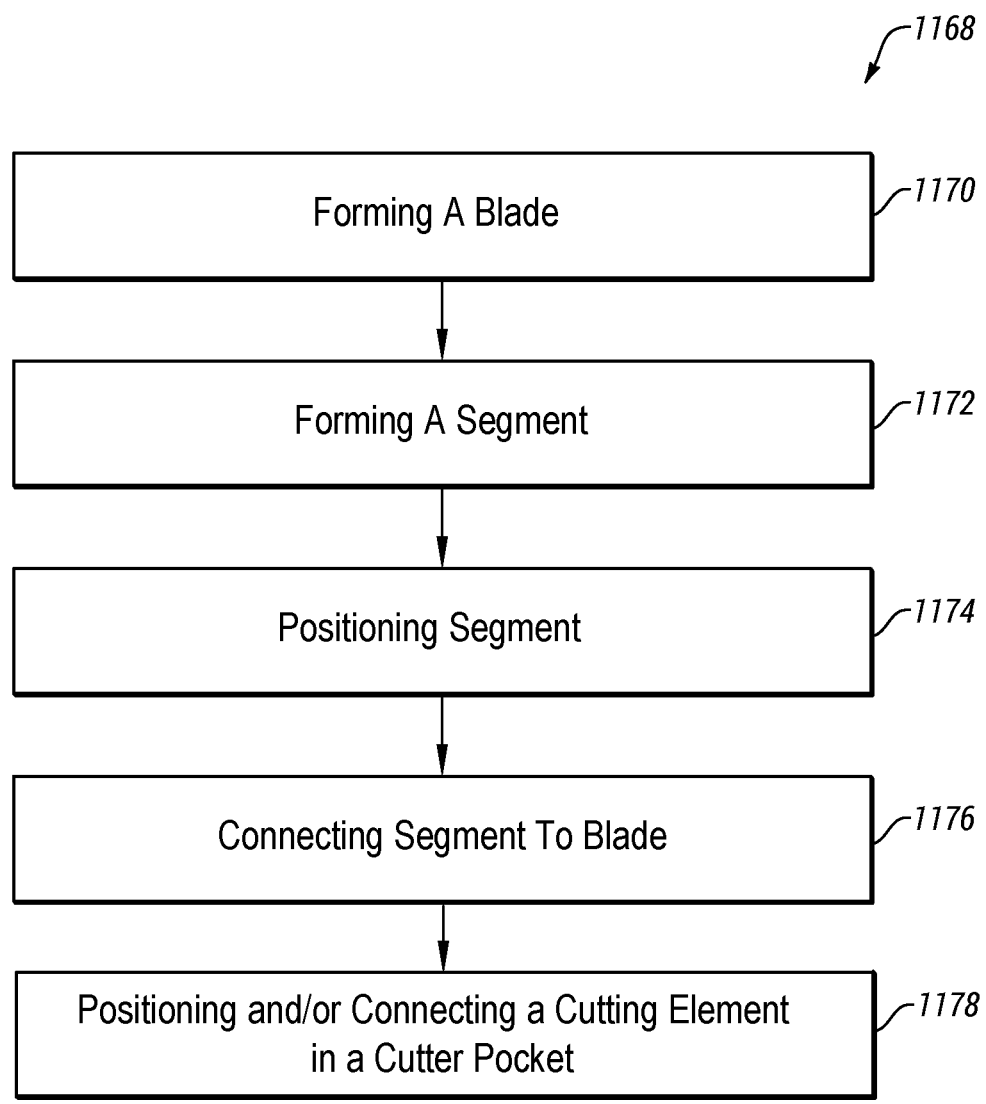
FIG. 12 is a flowchart of a method of manufacturing a cutting tool, according to at least one embodiment of the present disclosure.

Some embodiments of a cutting tool with a segment according to the present disclosure are manufactured according to a method such as illustrated in FIG. 12. In some embodiments, a method 1168 includes forming a blade from a body material at 1170. For example, the blade may be a bit blade, such as described in relation to FIG. 2, or the blade may be a milling or reamer/underreamer blade, such as described in relation to FIG. 11. The blade may be formed by a variety of methods, including but not limited to casting, machining, additive manufacturing, or combinations thereof. For example, a bit body may be cast with a blade protruding therefrom. In another example, a bit is machined with a blade integral with the bit body and protruding therefrom. In another example, a bit is cast or machined, and the blade is separately formed and welded or otherwise secured to the bit body. In yet another example, a bit body and blade are additively manufactured (collectively or separately). In at least some embodiments, forming the blade at 1170 also includes a blade with a void or recess therein. For instance, the blade may be cast, machined, or additively manufactured with a recess configured to receive a corresponding pre-formed segment that has higher wear and/or erosion resistance than the material of the blade and/or bit body.

In some embodiments, a recess defines an interface including one or more side surfaces and/or back surfaces, as described herein. The interface may include planar surfaces. In other embodiments, the interface includes at least one surface that is fully or partially curved or non-planar. In yet other embodiments, the interface is entirely curved or non-planar surfaces. According to at least some embodiments, forming the blade at 1170 includes forming full or partial cutter pockets.

The method 1168 may further include forming a segment from a segment material at 1172. In some embodiments, the segment includes one or more full or partial cutter pockets. In other embodiments, the segment is a pre-formed, protective, hardened faceplate that forms at least a portion of a cutter pocket, while a base of the cutter pocket is formed by the blade. In yet other embodiments, the segment is an insert that lacks a cutter pocket and is positioned in the blade for increased wear resistance. Optionally, the segment is an insert with gage protection or stabilizing element pockets.

In some embodiments, forming the segment includes shaping the segment to have a shape complementary to the recess and interface with the blade to fill at least a portion of the recess. For example, the segment may complementarily fit the recess and mate with substantially the entire interface. In another example, the segment may complementarily fit a portion of the void and mate with less than the entire interface. In at least one example, the segment includes a plurality of segment portions that complementarily fit the void and mate with substantially the entire interface as a complete set of segment portions.

The segment may be formed of a segment material by a variety of methods, including but not limited to casting, machining, additive manufacturing, or combinations thereof. For example, a segment may be cast to have a complementary fit with at least a portion of the void. In another example, a segment is machined (e.g., in a green state) to complementarily fit at least a portion of the void. In yet another example, a segment is additively manufactured to have a complementary fit with at least a portion of the void. In at least one example, the segment is additively manufactured, cast, or molded to approximate final dimensions and machined to complementarily fit at least a portion of the void.

The method 1168 may further include positioning the segment relative to a blade (e.g. in a recess or blade) at 1174 and connecting the segment to the blade at 1176. In some embodiments, connecting the segment to the blade includes the use of by welding, brazing, adhesive, a mechanical fastener (such as a bolt, screw, pin, clip, clamp, or other mechanical fasteners), mechanical interlock (such as grooves, dovetails, posts, recesses, ridges, other surface features, or other mechanical interlocks), or combinations thereof. In some embodiments, the segment is brazed to the blade. In other embodiments, the segment is at least partially retained with a mechanical interlock with the blade and partially retained with a braze joint between the segment and the blade. For example, a layer of braze between the segment and the blade may be approximately 0.004 in. (0.1 mm) in thickness.

In some embodiments, the segment and/or interface includes one or more surface features to space the segment and blade apart and create a gap into which the braze is positioned. For example, the segment may include one or more surface features that create a constant 0.002 in. (0.05 mm) to 0.006 in. (0.015 mm) gap between the blade and the segment. In some embodiments, the surface features provide a gap that is greater than or less than 0.004 in. (0.1 mm). For example, different brazes may flow more efficiently in a larger or smaller gap.

In the same or other embodiments, a segment is connected to the blade with a mechanical fastener and/or a resilient layer positioned between the segment and the blade, such as described in relation to FIG. 6. In such embodiments, the resilient layer may provide vibration dampening and/or absorption to limit vibration damage to the segment, the blade, or the connection therebetween. In some embodiments, a segment is connected to the blade with by using a substrate of the segment. For instance, the segment may include a segment material bonded or otherwise coupled to a substrate material, as described herein in relation to FIG. 7. The substrate material may be welded or brazed to a blade material, or may be coupled to the blade using mechanical fasteners.

In some embodiments, the method 1168 further includes positioning and connecting a cutting element in a cutter pocket of the segment and/or blade at 1178. In some embodiments, positioning and connecting the cutting element in the cutter pocket occurs before connecting a pre-formed or replaceable segment to a blade. For example, a cutting element may be brazed into the cutter pocket of a segment (such as shown in FIG. 4) before the segment is connected to the blade. In such examples, the subsequent connection of the segment with the blade indirectly affixes the cutting element to the blade. In another example, a faceplate is connected to the blade (see FIG. 8-1), and a cutting element is subsequently positioned in and connected to the cutter pocket formed by the blade and faceplate.

In embodiments utilizing braze materials and joints to connect the segment to the blade and using braze materials and joints to connect the cutting element to the cutter pocket and/or segment, either connection may be created first. For instance, a first brazing may include a relatively higher temperature braze, for example, greater than 1,600° F. (870° C.), and a second brazing may include a relatively lower temperature braze, for example, less than 1400° F. (760° C.). Performing the second braze at a lower temperature may limit and/or prevent damage to, or weakening of, the prior braze. In some embodiments, the melting temperature of the high temperature braze and low temperature braze is at least 100° F. (55° C.) apart from one another to limit damage to the prior braze. Methods of brazing may therefore include performing a lower temperature braze process at a temperature that is at least 100° F. (55° C.) lower than a high temperature braze process. In other embodiments, the high temperature braze and low temperature braze are performed at least 200° F. (110° C.) apart from one another to limit damage to the prior braze. In some embodiments, a segment and/or cutting element is heated to the lower brazing temperature to selectively facilitate repair and/or replacement of the segment and/or cutting element connected by the low temperature braze.

Figure 13:
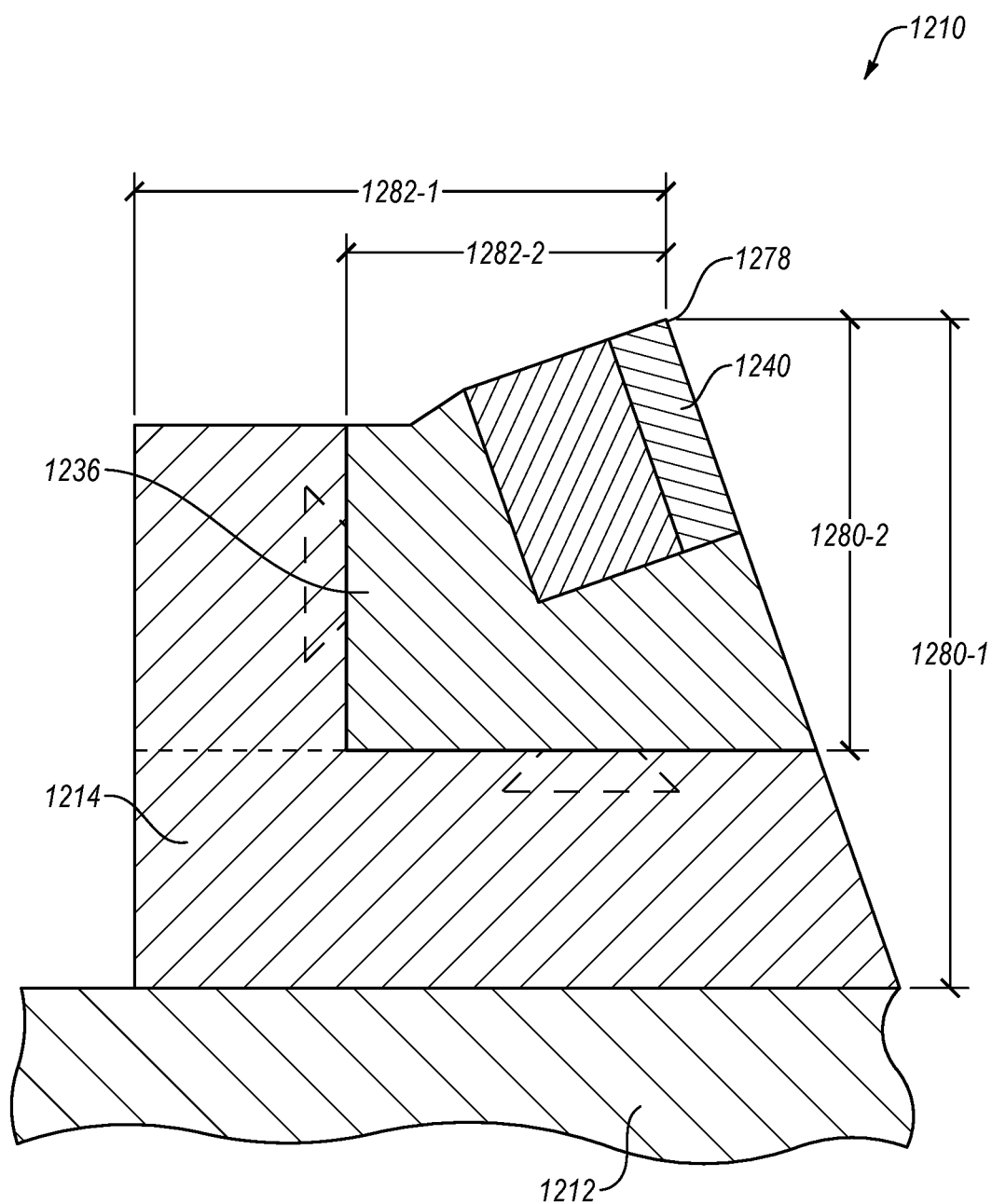
FIG. 13 is a side cross-sectional view of an example replaceable cutting structure segment connected to a blade of a cutting tool, according to at least one embodiment of the present disclosure.

While embodiments of segments have been described herein with and without cutter pockets or with a portion of a cutter pocket therein, the segment itself may additionally have a range of geometries relative to the blade. FIG. 13 is a side cross-sectional view of another embodiment of a bit 1210, according to the present disclosure. In some embodiments, a pre-formed, replaceable segment 1236 is optionally hardened relative to a blade material, and connected to the blade 1214, which extends from a bit body 1212. A cutting element 1240 may be positioned in and connected to the segment 1236. In some embodiments, a size of the segment 1236 is defined by a vertical ratio and a horizontal ratio relative to a cutting tip 1278 of the cutting element 1240. The cutting tip 1278 may be the outermost point of the cutting element 1240 from the bit body 1212, such that the cutting tip 1278 is the first point of the cutting element 1240 to contact the material being removed during cutting operations.

In some embodiments, the blade 1214 has a blade height 1280-1 and the segment 1236 has a segment height 1280-2. The blade height 1280-1 is measured from the bit body 1212 to the cutting point 1278. The segment height 1280-2 is measured from the point of the segment 1236 closest to the bit body 1212 to the cutting point 1278.

The vertical ratio is the ratio of the segment height 1280-2 to blade height 1280-1. For example, a segment height 1280-2 that is one half of the blade height 1280-1 has a vertical ratio of 0.5. In some embodiments, the vertical ratio is in a range having an upper value, a lower value, or upper and lower values including any of 0.1, 0.25, 0.5, 0.75, 0.95, 1.0, or any values therebetween. For example, the vertical ratio may be greater than 0.1. In other examples, the vertical ratio is between 0.2 and 0.95. In yet other examples, the vertical ratio is between 0.3 and 0.95. In further examples, the vertical ratio is between 0.34 and 0.9. In at least one example, the vertical ratio is greater than 0.34. In still other embodiments, the vertical ratio is less than 0.1 or even greater than 1.0 (e.g., where the segment is inset into the bit body and extends the full blade height 1280-1).

In some embodiments, the blade 1214 has a blade width 1282-1 and the segment 1236 has a segment width 1282-2. The blade width 1282-1 is measured from the rearmost point of the blade 1214 to the cutting point 1278. The segment width 1282-2 is measured from the rearmost point of the segment 1236 to the cutting point 1278.

The horizontal ratio is the ratio of the segment width 1282-2 to blade width 1282-1. For example, a segment width 1282-2 that is one half of the blade width 1282-1 has a horizontal ratio of 0.5. In some embodiments, the horizontal ratio is in a range having an upper value, a lower value, or upper and lower values including any of 0.1, 0.25, 0.5, 0.75, 0.95, 1.0, or any values therebetween. For example, the horizontal ratio may be greater than 0.1. In other examples, the horizontal ratio is between 0.2 and 0.95. In yet other examples, the horizontal ratio is between 0.3 and 0.95. In further examples, the horizontal ratio is between 0.37 and 0.9. In at least one example, the horizontal ratio is greater than 0.37. In still other embodiments, the horizontal ratio is less than 0.1 or greater than 1.0 (e.g., where the segment over hangs the blade 1214). In FIG. 13, the dashed lines on the base of the blade illustrate an example segment 1236 having a horizontal ratio equal to 1.0.

In at least one embodiment, a cutting tool according to the present disclosure has an increased operational lifetime relative to a conventional cutting tool. In some embodiments, a cutting tool with blades incorporating pre-formed, replaceable segments according to the present disclosure exhibits increased wear/erosion resistance relative to a conventional cutting tool. For instance, one or more segments may be located in places on the blade where wear and erosion are highest. When the segments wear, they may be removed and replaced to extend the operational life of the bit body and blades. For instance, phantom lines illustrate the use of example mechanical fasteners (e.g., complementary dovetail pins and sockets) that may be used in addition to, or instead of, braze, welding, or other fastening methods. In the same or other embodiments, a cutting tool with blades incorporating segments according to the present disclosure may allow for faster and/or easier repairs relative to conventional cutting tools in which the blades are integral with the body, or even in which the blades themselves are removable or replaceable.

Embodiments of cutting tools have been primarily described with reference to wellbore cutting operations; however, the cutting tools described herein may be used in applications other than the drilling of a wellbore. In other embodiments, cutting tools according to the present disclosure are used outside a wellbore or other downhole environment used for the exploration or production of natural resources. For instance, cutting tools of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements. Permissive terms "may" or "can" are used herein to indicate that features are present in some embodiments, but are optional and are not included in other embodiments within the scope of the present disclosure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A cutting tool, comprising:
a body having a longitudinal axis;
a blade extending radially from the body;
a faceplate coupled to the blade and made of a different material than the blade, wherein the faceplate is pre-formed, the faceplate and blade cooperatively defining a plurality of cutter pockets partially in the faceplate and partially in the blade, wherein each cutter pocket of the plurality of cutter pockets comprises a sidewall and a base, wherein the sidewall is defined by the blade and the faceplate, and the base is defined within the blade; and
a plurality of cutting elements, each cutting element brazed to both the blade and to the faceplate in a respective cutter pocket of the plurality of cutter pockets.

2. The cutting tool of claim 1, the faceplate coupled to the blade by one or more of a braze joint, a weld joint, or a mechanical fastener.

3. The cutting tool of claim 2, further comprising:
an energy absorption layer between at least a portion of the faceplate and the blade.

4. The cutting tool of claim 1, the faceplate being a first faceplate and coupled to a rotationally leading face of the blade, the cutting tool further comprising:
a second faceplate coupled to a top surface of the blade.

5. The cutting tool of claim 1, further comprising:
a first braze joint connecting the faceplate to the blade with a first braze material; and
a second braze joint connecting each cutting element to the faceplate with a second braze material, the first braze material and the second braze material having different melting temperatures.

6. The cutting tool of claim 5, wherein a first melting temperature of the first braze material is at least 100° F. apart from a second melting temperature of the second braze material.

7. The cutting tool of claim 1, the blade including steel.

8. The cutting tool of claim 7, the faceplate including a ceramic material.

9. The cutting tool of claim 8, the faceplate including an additively manufactured ceramic material metallurgically bonded to a metal alloy substrate during the additive manufacturing process.

10. A downhole tool, comprising:
a rotatable body;
a blade extending from the body, the blade including a recess therein that defines an interface;
a pre-formed hardfacing element coupled to the blade along at least a portion of the interface, the blade and pre-formed hardfacing element cooperatively defining sidewalls of a plurality of cutter pockets partially within the pre-formed hardfacing element and partially within the blade, wherein the blade defines bases of plurality of cutter pockets; and a plurality of cutting elements, each cutting element brazed to both the blade and to the pre-formed hardfacing element in a respective cutter pocket of the plurality of cutter pockets.

11. The downhole tool of claim 10, the pre-formed hardfacing element being a first pre-formed hardfacing element, the downhole tool further comprising:

a second pre-formed hardfacing element coupled to the blade along another portion of the interface, the blade and the second pre-formed hardfacing element cooperatively defining another plurality of cutter pockets partially within the second pre-formed hardfacing element and partially within the blade.

12. The downhole tool of claim 11, the recess and the first and second pre-formed hardfacing elements being located in a rotationally leading face of the blade.

13. The downhole tool of claim 10, the pre-formed hardfacing element being a first pre-formed hardfacing element and the recess being a first recess, the first recess and the first pre-formed hardfacing element being located in a rotationally leading face of the blade, the downhole tool further comprising:

a second pre-formed hardfacing element coupled to the blade within a second recess of the blade, the second recess and the second pre-formed hardfacing element being located in a top face of the blade.

14. The downhole tool of claim 10, the interface being at least partially non-planar.

15. A method of manufacturing a downhole tool, comprising:

forming a blade, the blade defining a recess and base portions of a plurality of cutter pockets adjacent the recess;

forming at least one faceplate having sidewall portions of the plurality of cutter pockets;

positioning the at least one faceplate in the recess such that the base portions of the plurality of cutter pockets within the blade and the sidewall portions of the plurality of cutter pockets within the faceplate cooperatively define a plurality of complete cutter pockets; and connecting the at least one faceplate to the blade;

positioning a cutting element in each cutter pocket of the plurality of cutter pockets; and brazing each cutting element to both the at least one faceplate and the blade after connecting the at least one faceplate to the blade.

16. The method of claim 15, wherein forming the at least one faceplate includes additively manufacturing the faceplate of sintered, cemented tungsten carbide.

17. The method of claim 16, wherein forming the blade includes machining the blade or casting the blade from a metal alloy, and with the blade integral with a body of the downhole tool.

18. The method of claim 15, wherein connecting the at least one faceplate to the blade comprises brazing the at least one faceplate with a first braze material with a first melting temperature, and brazing the cutting element to the at least one faceplate and the blade comprises brazing the cutting element with a second braze material with a second melting temperature less than the first melting temperature.

* * * * *